US008269767B2

(12) United States Patent
Glueck et al.

(10) Patent No.: US 8,269,767 B2
(45) Date of Patent: Sep. 18, 2012

(54) MULTISCALE THREE-DIMENSIONAL REFERENCE GRID

(75) Inventors: Michael Glueck, Toronto (CA); Azam Khan, Aurora (CA)

(73) Assignee: Autodesk, Inc., San Rafael, CA (US)

( * ) Notice: Subject to any disclaimer, the term of this patent is extended or adjusted under 35 U.S.C. 154(b) by 825 days.

(21) Appl. No.: 12/365,048

(22) Filed: Feb. 3, 2009

(65) Prior Publication Data
US 2010/0194743 A1 Aug. 5, 2010

(51) Int. Cl.
*G06T 15/00* (2011.01)
(52) U.S. Cl. ........................................ 345/419
(58) Field of Classification Search .................. 345/419, 345/427
See application file for complete search history.

(56) References Cited

U.S. PATENT DOCUMENTS

| | | | | | |
|---|---|---|---|---|---|
| 3,991,310 | A | * | 11/1976 | Morrison | 378/65 |
| 4,578,766 | A | * | 3/1986 | Caddy | 345/440 |
| 5,444,833 | A | * | 8/1995 | Kawai et al. | 345/676 |
| 5,448,053 | A | * | 9/1995 | Rhoads | 250/201.9 |
| 6,084,227 | A | * | 7/2000 | Rhoads | 250/201.9 |
| 6,106,561 | A | * | 8/2000 | Farmer | 703/10 |
| 6,597,818 | B2 | * | 7/2003 | Kumar et al. | 382/294 |
| 6,956,567 | B2 | * | 10/2005 | Sinn | 345/419 |
| 7,773,799 | B2 | * | 8/2010 | Oldroyd | 382/154 |
| 8,107,722 | B2 | * | 1/2012 | Oldroyd | 382/154 |
| 2001/0009974 | A1 | * | 7/2001 | Reisfeld | 600/407 |
| 2004/0001110 | A1 | * | 1/2004 | Khan | 345/848 |
| 2006/0227134 | A1 | * | 10/2006 | Khan et al. | 345/420 |
| 2006/0267803 | A1 | * | 11/2006 | Mathis et al. | 340/995.15 |
| 2008/0123927 | A1 | * | 5/2008 | Miga et al. | 382/131 |
| 2008/0181487 | A1 | * | 7/2008 | Hsu et al. | 382/154 |

OTHER PUBLICATIONS

Aarnes et al. "A Multiscale Method for Modeling Transport in Porous Media on unstructured corner-point Grids". Published 2007.*
Ayatsuka, et al., "Penumbrae for 3D interactions," In Proceedings of the 9*th* Annual ACM Symposium on User interface Software and Technology, Nov. 6-8, 1996, pp. 165-166, ACM, New York, NY.
Ayatsuka, et al., "Layered Penumbrae: An Effective 3D Feedback Technique," In proceedings of the Third Asian Pacific Computer and Human interaction, Jul. 15-17, 1998, pp. 1-8, APCHI. IEEE Computer Society, Washington, D.C.
Baudisch, et al., "Halo: a Technique for Visualizing Off-Screen Locations," In Proceedings of the SIGCHI Conference on Human Factors in Computing Systems, Apr. 5-10, 2003, pp. 481-488, CHI '03. ACM, New York, NY.
Cutting, et al., "Perceiving Layout and Knowing Distances: The Integration, Relative Potency, and Contextual Use of Different Information about Depth," Handbook of perception and cognition, 1995, pp. 69-117, vol. 5; Perception of space and motion, W. Epstein & S. Rogers, Eds., Academic Press, San Diego, CA.

(Continued)

*Primary Examiner* — Kimbinh T Nguyen
(74) *Attorney, Agent, or Firm* — Patterson & Sheridan, LLP

(57) ABSTRACT

One embodiment of the present invention sets forth a technique for providing a multiscale three-dimensional reference grid that is displayed in design software application programs. The reference grid appears infinite in space and scale. Depth cues are provided that are independent of the viewing projection to allow an end user to sense the orientation of the workspace and how objects in workspace relate to each other in terms of position and scale. Divisions of the grid represent real-world units that are determined dynamically, enabling smooth transitions as divisions are added and removed. The reference grid provides an end user with reference imagery for camera-operation visualization and scene content understanding.

18 Claims, 18 Drawing Sheets

OTHER PUBLICATIONS

Fitzmaurice, et al., "Safe 3D navigation," In Proceedings of the 2008 Symposium on interactive 3D Graphics and Games, Feb. 15-17, 2008, pp. 7-15, SI3D '08. ACM, New York, NY.

Hagen, M. A., "How to Make a Visually Realistic 3D Display," Apr. 1991, pp. 6, SIGGRPAH Comput. Graph. 25, 2.

Haller, et al., "A Real-Time Shadow Approach for an Augmented Reality Application Using Shadow Volumes," In the Proceedings of the ACM Symposium on Virtual Reality Software and Technology, Oct. 1-3, 2003, pp. 56-65, VRST '03. ACM, New York, NY.

Herndon, et al., "Interactive Shadows," In Proceedings of the 5th Annual ACM Symposium on User Interface Software and Technology, Nov. 15-18, 1992, pp. 1-6, UIST '92. ACM, New York, NY.

Hubona, et al., "The Relative Contributions of Stereo, Lighting, and Background Scenes in Promoting 3D Depth Visualization," Sep. 1999, pp. 214-242, vol. 6, No. 3.

Murray, J., "Some Perspectives on Visual Depth Perception," May 1994, pp. 155-157, SIGGRAPH Comput. Graph. vol. 28, No. 2.

Naemura, et al., "Virtual Shadows—Enhanced Interaction in Mixed Reality Environment," In Proceedings of the IEEE Virtual Reality Conference, Mar. 24-28, 2002, pp. 293, VR. IEEE Computer Society, Washington, D.C.

Neider, J. et al., "OpenGL Programming Guide: The Official Guide to Learning OpenGL, Release 1," Jun. 1993, Addison-Wesley Longman Publishing Co., Inc., Boston, MA.

Ritter, et al., "Illustrative Shadows: Integrating 3D and 2D Information Displays," In Proceedings of the 8th international Conference on intelligent User interfaces, Jan. 12-15, 2003, pp. 166-173, New York, NY.

Tory, et al.., "Visualization Task Performance with 2D, 3D, and Combination Displays," Jan. 2006, pp. 2-13, IEEE Transactions on Visualization and Computer Graphics 12, 1.

Wanger, Leonard., "The Effect of Shadow Quality on the Perception of Spatial Relationships in Computer Generated Imagery," In Proceedings of the 1992 Symposium on interactive 3D Graphics, 1992, pp. 39-42, SI3D '92. ACM, New York, NY.

Wanger, et al., "Perceiving Spatial Relationships in Computer-Generated Images," May 1992, pp. 44-51, 54-58, IEEE Comput. Graph. Appl. 12, 3.

Wickens, et al., "Three-Dimensional Displays: Perception, Implementation, and Applications," Technical Report, University of Illinois, Jan.-Oct. 1989.

Williams, Lance., "Pyramidal Parametrics," Jul. 1983, pp. 1-11, SIGGRAPH Comput. Graph vol. 17, No. 3.

Zhai, et al., "The Partial-Occlusion Effect: Utilizing Semitransparency in 3D Human-Computer Interaction," Sep. 1996, pp. 254-284, ACM Trans. Comput.-Hum. Interact. vol. 3, No. 3.

* cited by examiner

MULTISCALE THREE-DIMENSIONAL REFERENCE GRID

BACKGROUND OF THE INVENTION

1. Field of the Invention

Embodiments of the present invention relate generally to a three-dimensional (3D) authoring application interface and more specifically to a multiscale 3D reference grid.

2. Description of the Related Art

Conventional reference grids are used in design software application programs to help an end user judge distances between objects and to understand the orientation of the virtual workspace. The challenge is to show reference imagery to the end user that is visible and meaningful in as many viewing conditions as possible, without being too distracting. Reference visualization is significantly more difficult than it may seem, since it spans a huge problem domain with many special cases. Many of the perceptual cues we rely on to understand relative position and distance in the real world are not always easily conveyed in static two-dimensional projections of 3D space. Some of the fundamental difficulties in 3D interaction involve being inside or outside of an object, closeness of the viewpoint to an object, egocentric vs. exocentric thinking in terms of determining what the end user is looking at, and parallel vs. perspective viewing projections.

3D application programs such as video games put significant effort into providing realistic texturing, shading, and shadowing to provide users with depth cues, but these techniques are often not practical while the end user is creating a new 3D model using a 3D authoring application program since the scene content is not constrained. Therefore, authoring application programs must use other means to communicate depth cues that are effective on abstract and/or incomplete 3D scenes.

An approach used by conventional authoring application programs to help users comprehend the spatial relationships between objects in a scene is to display a reference grid centered at the origin of the ground plane. The grid typically shows thicker major lines with thinner minor lines between the major lines. In a parallel viewing projection, the lines are usually drawn to fill the viewport. However, this approach has some problems that limit its utility. For example, depth cues may be explicitly removed to provide consistency in scale for the objects in the scene. The end user may also have difficulty determining whether the viewpoint is above or below the grid and how objects in the scene relate to each other.

In a perspective viewing projection, the grid usually has a fixed number of lines that allow an end user to sense the orientation of the workspace and see the number of grid divisions that are between objects to determine relative distances. However, objects in the scene often fall outside of the fixed-sized grid or completely encompass the grid. Small objects can fall completely between grid lines, removing any relative position cues.

When confronted with an ambiguous 3D scene, an end user often compensates for shortcomings of reference imagery by constructing a mental model of the scene, to clarify the orientation, position, and scale of objects in the scene, by viewing the scene from different viewpoints and garnering depth cues by frequently changing the camera position. Unfortunately, this workflow forces the end user to work primarily from memory to guide future decisions and actions. It also requires a proficiency in mentally transforming and manipulating 3D objects.

As the foregoing illustrates, what is needed in the art is a technique for providing users with continuous orientation, position, and scale reference imagery in 3D application programs.

SUMMARY OF THE INVENTION

One embodiment of the present invention sets forth a method for generating a multiscale three-dimensional reference grid positioned in a workspace. The method includes the steps of determining a closest point disposed on a plane of the three-dimensional reference grid and viewable by a camera, computing a scale for the three-dimensional reference grid based on the coordinates of the closest point, where the spacing of grid lines in the three-dimensional reference grid is based on the computed scale. The graphics workspace and the three-dimensional reference grid as viewed from the camera are rendered to produce a display image. The display image is stored in a memory or displayed on a display device.

One advantage of the disclosed method is that it provides users with continuous orientation, position, and scale reference imagery in 3D application programs.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
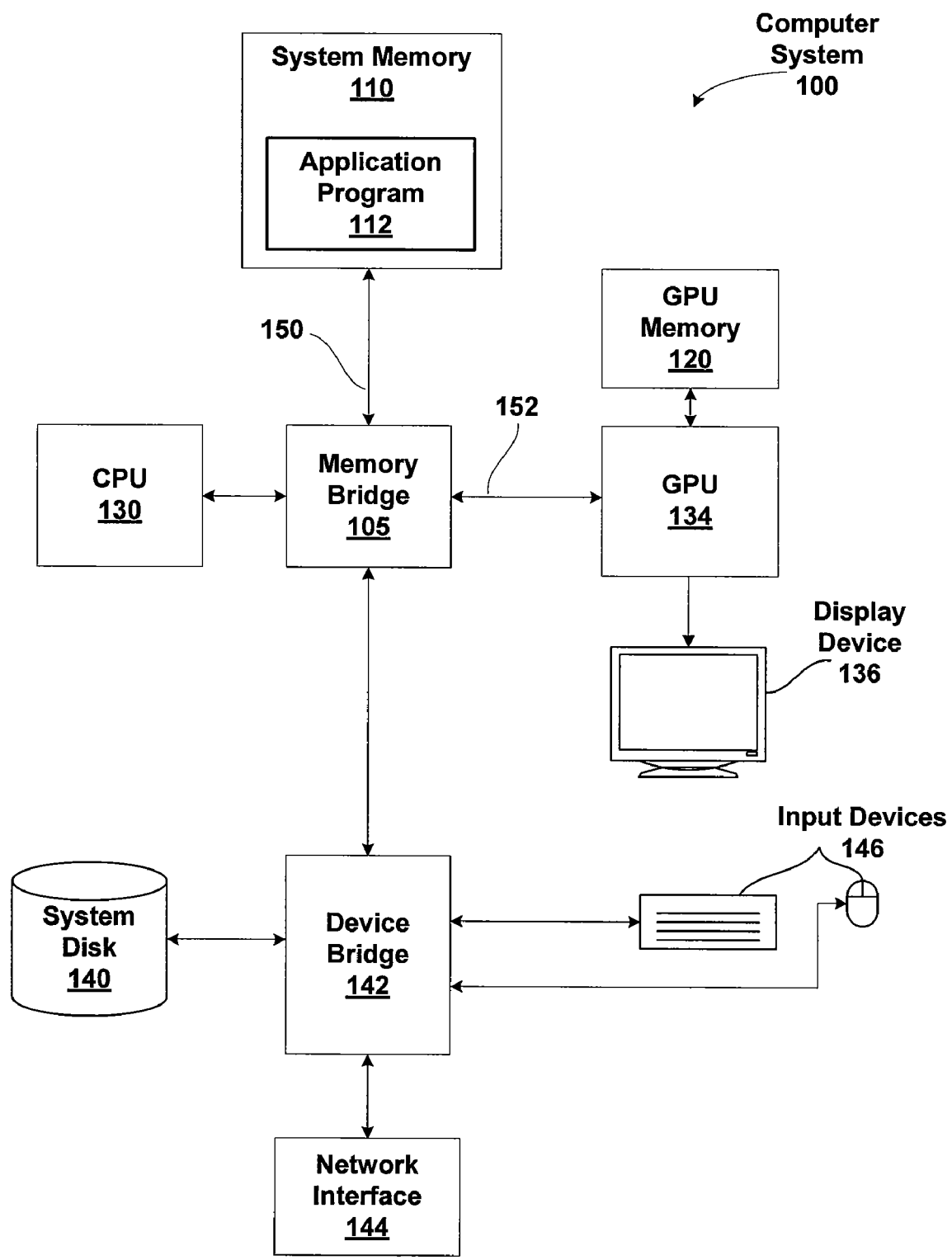
FIG. 1 illustrates a computer system configured to implement one or more aspects of the present invention.

FIG. 1 illustrates a computer system 100 configured to implement one or more aspects of the present invention. The computer system 100 includes, without limitation, a central processing unit (CPU) 130, a system memory 110, a graphics processing unit (GPU) 134, a GPU memory 120, a memory bridge 105, a display device 136, a system disk 140, a device bridge 142, a network interface 144, a mouse 146, and input devices 146.

The CPU 130 communicates with the system memory 110 via the memory bridge 105, which may be, e.g., a Northbridge device or subsystem. System memory 110 is configured to store application programs, as well as data used by or generated by the CPU 130. System memory 110 is coupled to the memory bridge 105 via a system memory bus 150. The memory bridge 105 is coupled to the GPU 134 via a GPU system bus 152. The GPU system bus 152 may comprise any technically feasible data interconnect, such as the well known personal computer interconnect (PCI) express bus. The memory bridge 105 is also coupled to the device bridge 142 using an interconnect system such as PCI. The GPU 134 conventionally incorporates real time image rendering means for rendering both three-dimensional (3D) and two-dimensional (2D) images. The GPU 134 delivers pixel data to display device 136, which may comprise a conventional CRT or LCD display. The GPU 134 is coupled to the GPU memory 120 using a GPU memory bus 154. The GPU memory 120 may be configured to store data used by or generated by the GPU 134. Data stored within the GPU memory 120 passes through the GPU 134 and the memory bridge 105 when accessed by the CPU 130. In some embodiments, the integrated circuit implementing the CPU 130 may incorporate additional functional blocks, such as the memory bridge 105 and the device bridge 142. In alternative embodiments, the integrated circuit implementing the GPU 134 may incorporate additional functional blocks, such as the memory bridge 105 and the device bridge 142.

The device bridge 142 is coupled to a hard drive 140, a network interface 144, a mouse 146, and input devices 146.

The hard drive 140 provides mass storage of programs and data. The network interface 144 provides network connectivity to other computers using a local area network (LAN) interface using any suitable technology, such as Ethernet. The mouse 146 and input devices 146 provide user input. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, Quick Path Interconnect, or any other bus or point-to-point communication protocol(s), and connections between different devices may use different protocols as is known in the art.

In one embodiment, system memory 110 is configured to store a graphics modeling or authoring application program 112 that is configured to provide a scalable 3D reference grid. System memory 110 an/or GPU memory 120 may be configured to store a plurality of frame buffers 118, which may be configured to store scenes rendered by GPU 134. The scenes may be displayed on display device 136.

Figure 2A:
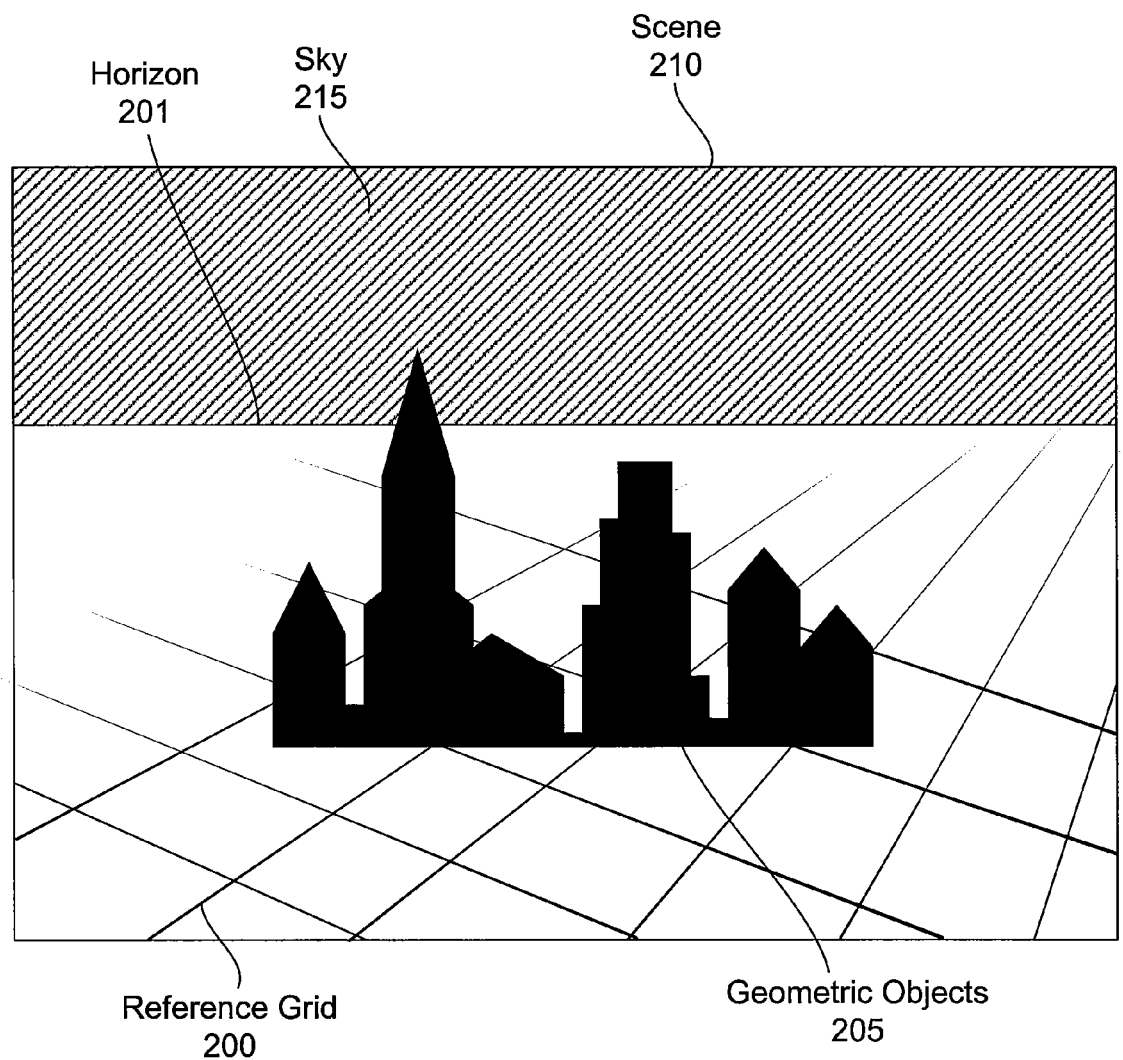
FIG. 2A illustrates a multiscale 3D reference grid using a perspective projection, according to one embodiment of the invention.

FIG. 2A illustrates a three-dimensional graphics scene 210 of a workspace that includes a multiscale 3D reference grid 200, according to one embodiment of the invention. The workspace is viewed from a camera using a perspective viewing projection to produce the scene 210. The scene 210 includes geometric objects 205 shown as buildings. In other embodiments, the workspace may include other objects typically used in design software applications, such as system components for mechanical and/or electrical devices, animation characters, virtual worlds, and the like. The reference grid is used in the scene 210 to make the depth cues explicit in order to clarify the viewpoint and relative position of objects in the scene 210.

The reference grid 200 lies on the conceptual ground plane of the scene 210. A legend may be displayed in the scene (not shown) to indicate the scale represented by the reference grid 200. Note that the reference grid 200 appears to vanish before it has reached the horizon 201. The horizon 201 is explicitly drawn in the scene 210 to distinguish between the upper region as the sky 215 and the lower region as "ground." This distinction helps prevent the perception that a distant object, beyond the visible extents of the reference grid 200, is floating. The sky 215 may be rendered with a color and transparency to provide the end user with an environmental frame of reference.

The grid lines of reference grid 200 fade as they move further from the camera to provide depth cues to the end user. When the perspective viewing projection is used, the fading effect also reduces anti-aliasing artifacts that occur when the grid lines become too dense in the distance.

Figure 2B:
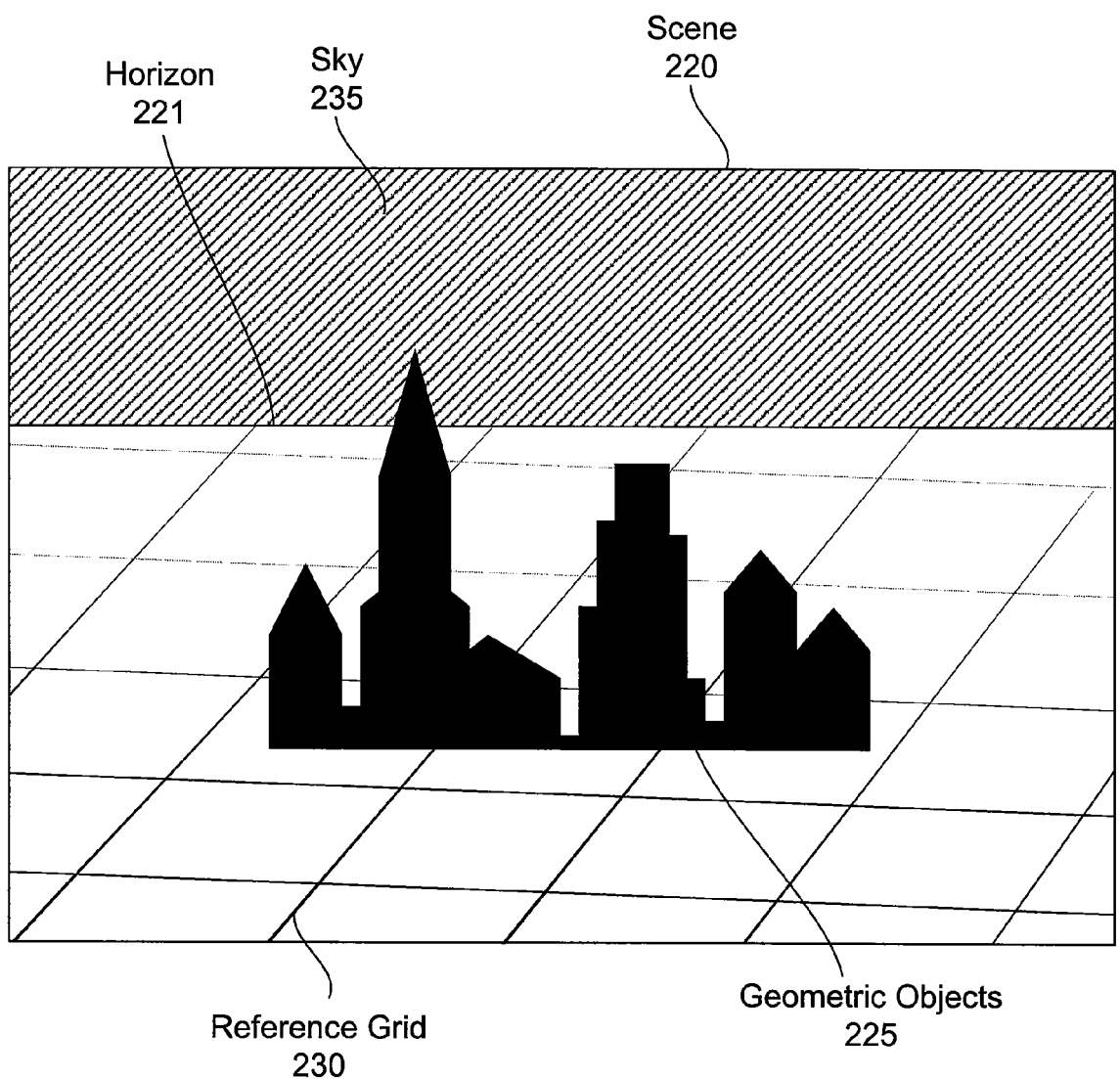
FIG. 2B illustrates a multiscale 3D reference grid using a parallel projection, according to one embodiment of the invention.

FIG. 2B illustrates a three-dimensional graphics scene 220 of the workspace that includes a multiscale 3D reference grid 230, according to one embodiment of the invention. The workspace is viewed from a camera using a parallel viewing projection to produce the scene 230. The scene 220 includes geometric objects 225 shown as buildings, and the horizon 221 is drawn to distinguish between the sky 235 and the ground to provide the end user with depth cues. The sky 235 may be rendered with a color and transparency to provide the end user with an environmental frame of reference.

Like the grid lines of reference grid 200, the grid lines of reference grid 230 fade as they move further from the camera to provide depth cues to the end user. When the parallel viewing projection is used, the fading of the grid lines allows users to discern in which direction the reference grid 230 recedes from the camera.

Figure 2C:
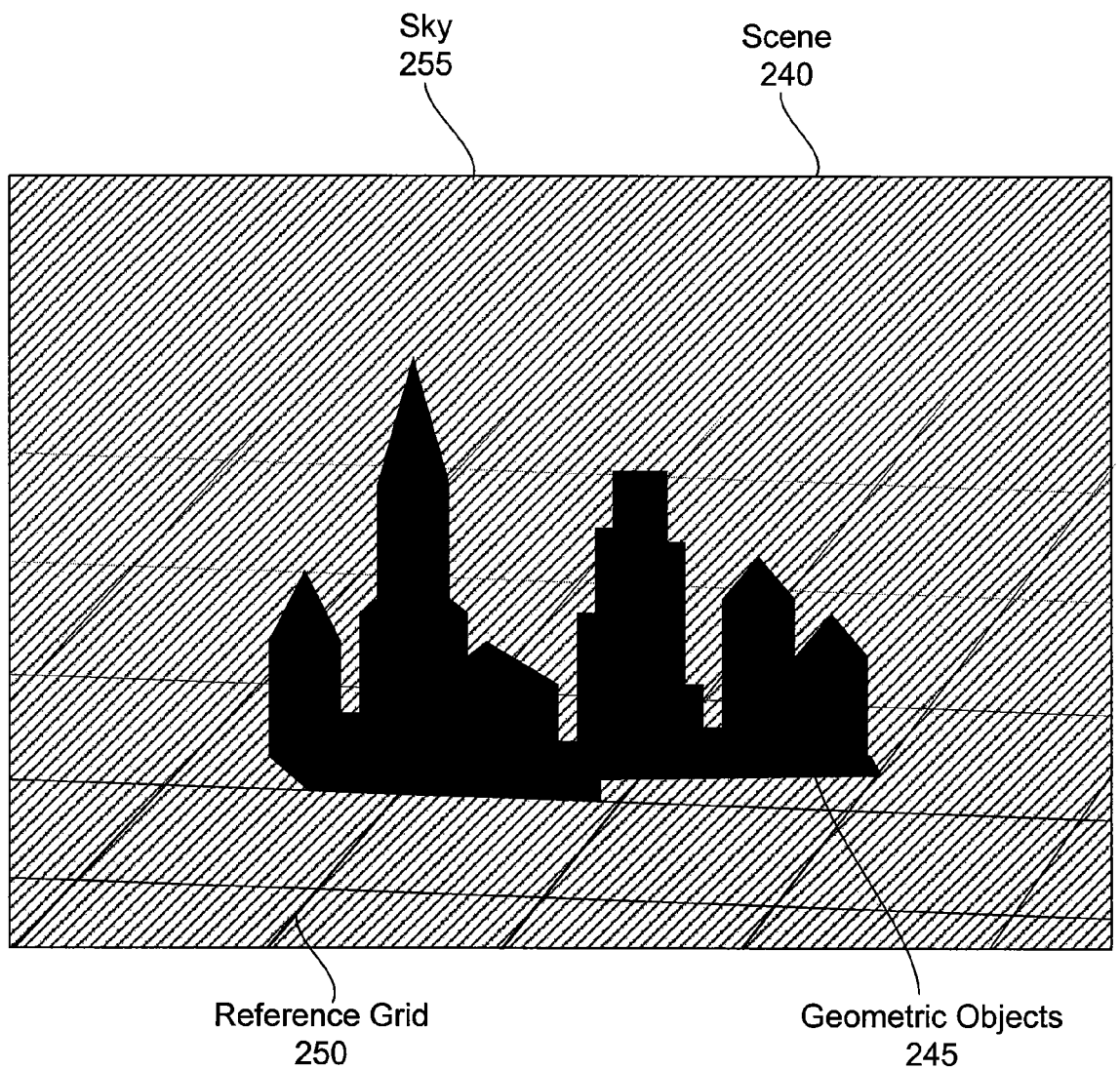
FIG. 2C illustrates a multiscale 3D reference grid using a parallel projection viewed from below the multiscale reference grid, according to one embodiment of the invention.

FIG. 2C illustrates a three-dimensional graphics scene 240 of the workspace that includes a multiscale 3D reference grid 250, according to one embodiment of the invention. The scene 240 is displayed using a parallel projection and the camera is positioned below the reference grid 250. The reference grid 250 is rendered as a semi-transparent plane including grid lines and the sky 255 and geometric objects 245 are viewed through the reference grid 250. The semi-transparent quality of the plane of the reference grid 250 provides depth cueing that helps an end user to determine where small objects, which do not pass through grid lines, intersect the reference grid 250. The semi-transparent quality also enables the end user to more easily determine whether an object lies above or below the reference grid 250.

In one embodiment, the end user may define an opacity and/or color of the reference grid using a graphical user interface (GUI) associated with the application program 112 of FIG. 1. Persons skilled in the art will recognize that a drag-and-drop scheme for defining associations may provide an intuitive and efficient entry means for users.

Figure 2D:
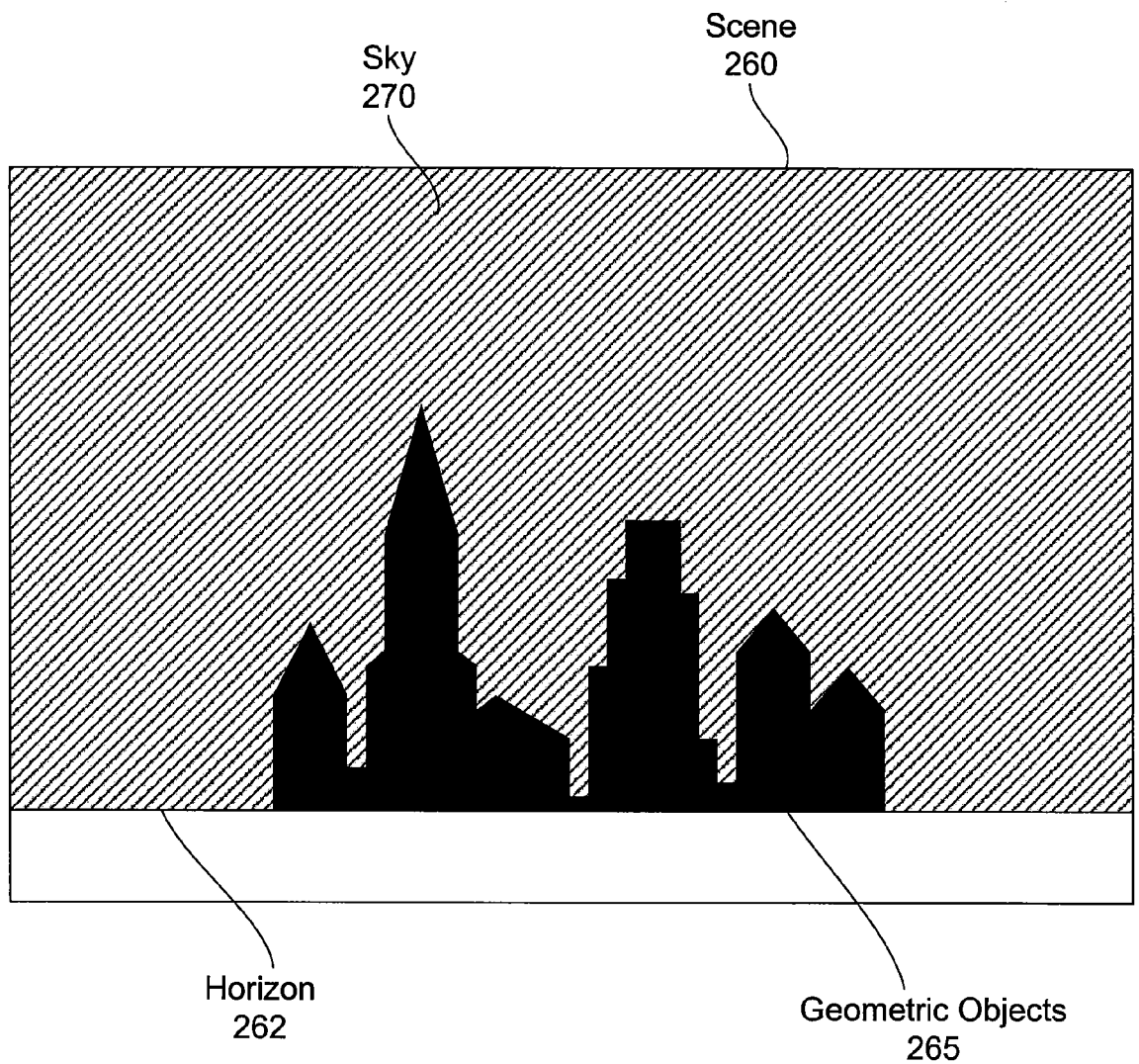
FIG. 2D illustrates a multiscale 3D reference grid using a parallel projection viewed from the side of the multiscale 3D reference grid, according to one embodiment of the invention.

FIG. 2D illustrates a three-dimensional graphics scene 240 of the workspace that includes a multiscale 3D reference grid, according to one embodiment of the invention. In the scene 260 is the workspace viewed from fully parallel viewing direction, i.e., from the side, so that the reference grid is not visible. The sky 270 is visible behind the geometric objects 265 in the scene 260. When the camera approaches the parallel view direction that is shown in FIG. 2D, the grid fades away and reduces to a single line that is coincident with the horizon 262. This provides the end user with a smooth transition to a fully parallel viewing direction.

The divisions of the reference grid represent real-world units. The scale of the units is determined dynamically so that the reference grid does not have too many or too few grid lines. The grid lines are not so many as to obscure the scene, while being frequent enough to provide relative position cues to the end user. The scale of the reference grid is determined as the camera position changes and objects in the scene are repositioned, added, or removed. Grid lines fade in and out as the scale changes to provide a smooth transition between scenes. In particular, an individual grid line will transition from being a major grid line to a minor grid line, fading as the camera moves further from the reference grid with a zoom out operation. Conversely, an individual grid line will transition from being a minor grid line to a major grid line, becoming more visible as the camera moves closer to the reference grid with a zoom in operation.

Figure 3A:
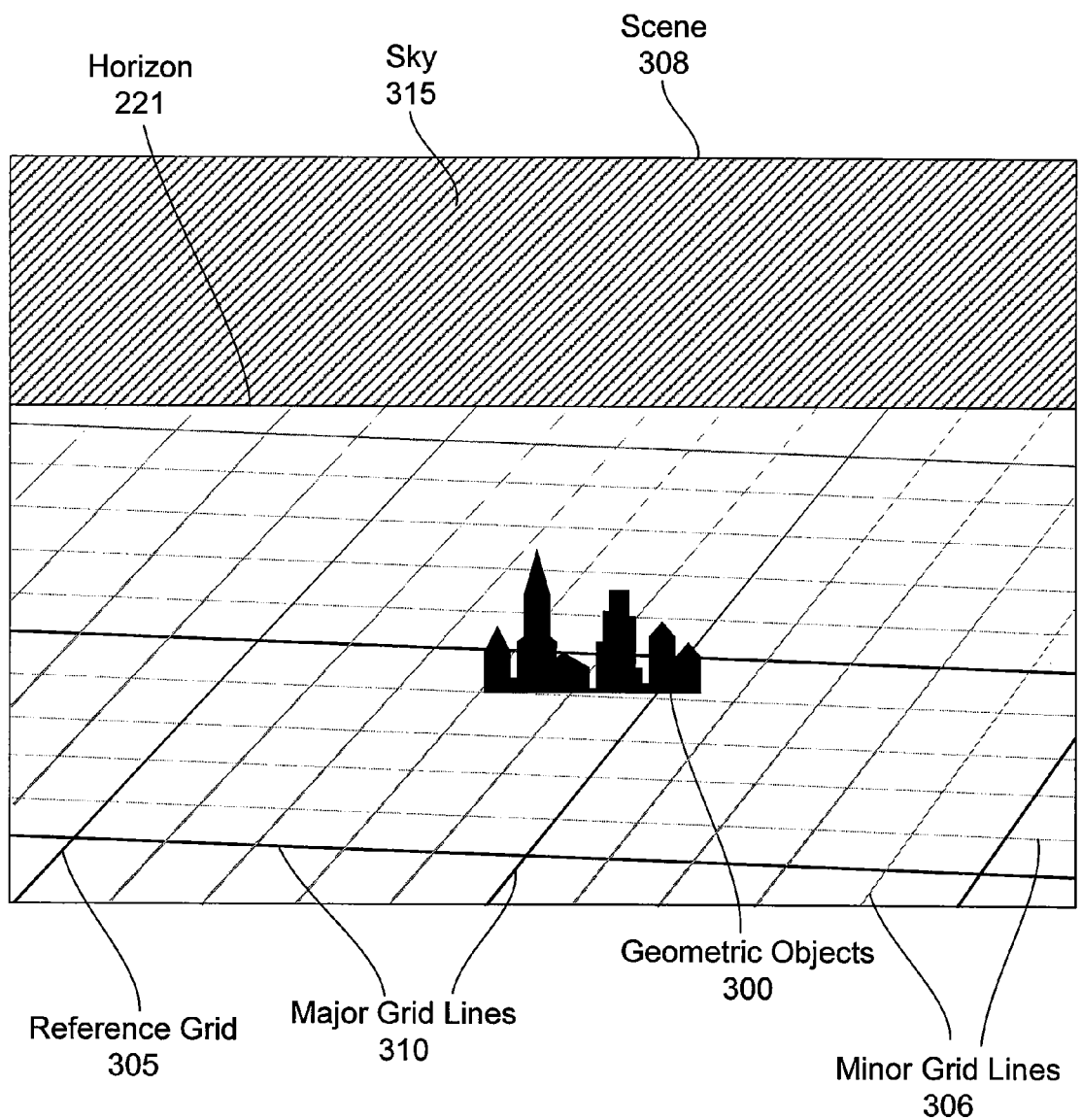
FIG. 3A illustrates a zoomed out multiscale 3D reference grid, according to one embodiment of the invention.

FIG. 3A illustrates a zoomed out multiscale 3D reference grid 305, according to one embodiment of the invention. The scene 308 is viewed using a parallel projection and includes geometric objects 300 and sky 315. The major grid lines 310 are more visible compared with the minor grid lines 306.

Figure 3B:
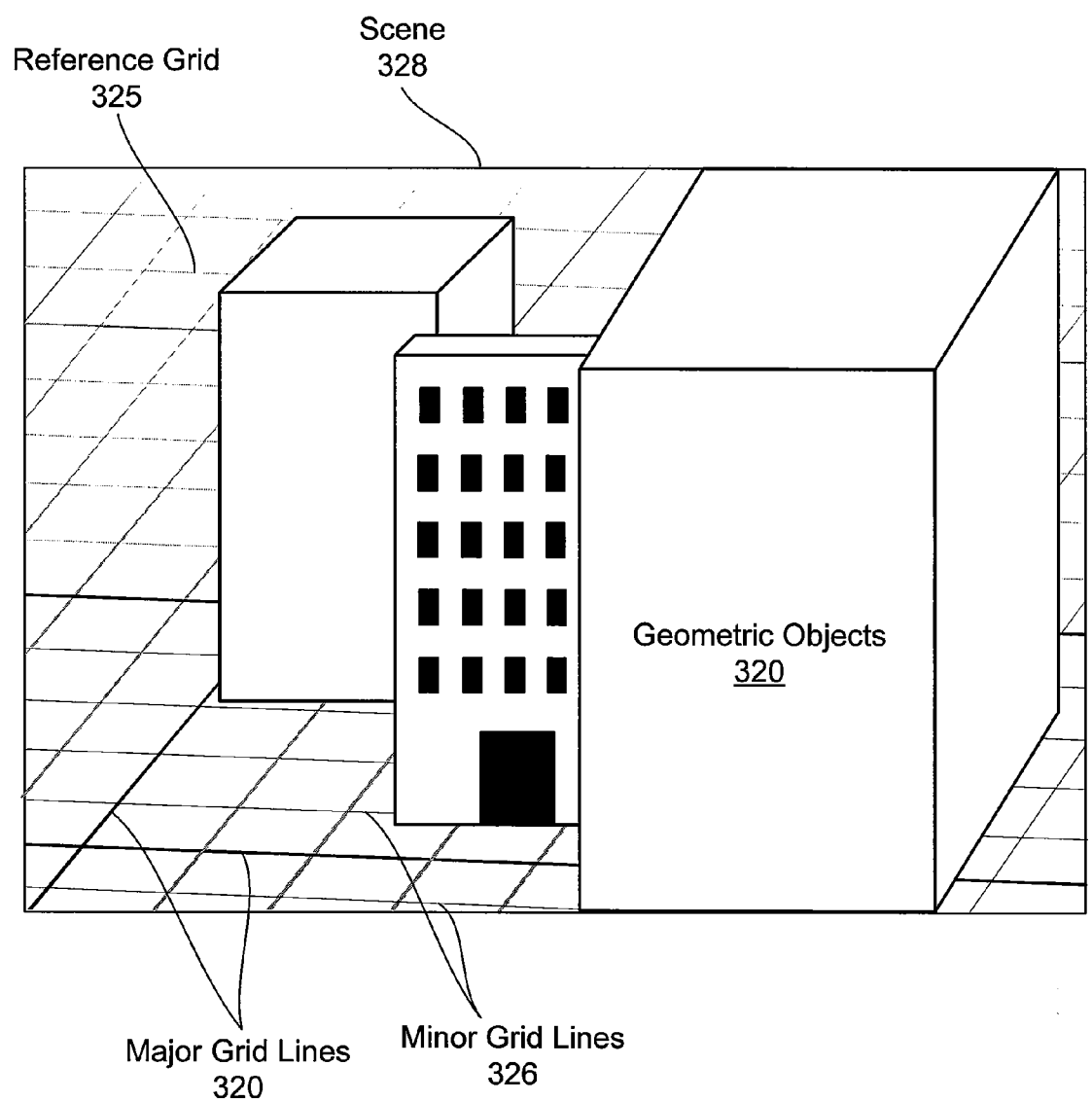
FIG. 3B illustrates a zoomed in view of a multiscale 3D reference grid, according to one embodiment of the invention.

FIG. 3B illustrates a zoomed in view of a multiscale 3D reference grid 325, according to one embodiment of the invention. The scene 328 is viewed using a parallel projection and includes geometric objects 320. The major grid lines 330 are more visible compared with the minor grid lines 326. Note, that if the grid spacing remains constant as the camera zooms in from FIG. 3A to FIG. 3B, the end user would no longer see the reference grid in FIG. 3B. As the camera zooms out from FIG. 3B to FIG. 3A, and even further, the number of grid lines should not continuously increase. Therefore, a maximum grid line density (number of grid lines drawn) may be imposed, while still giving an accurate sense of scale and location. Reference grids 305 and 325 appear infinite in space and scale, providing users with continuous orientation, position, and scale imagery for camera-operation visualization and scene content understanding.

In order to achieve smooth transitions between major and minor grid lines, while still ensuring a perceptible distinction between major and minor grid lines, an inverse sigmoid function may be used to provide a quick fade in, a plateau at semi-transparency, and then a quick transition to the most visible, major grid lines. The following formula may be used to determine the opacity of a grid line, where B is the opacity value ranging in value from zero to one, inclusive:

$$B=-\text{beta}(\ln(1/(y+m)-n)+c). \qquad \text{Equation 1}$$

Values of beta=−0.125, c=1.5, m=0.01, and n=0.995 have been found to produce smooth transitions. Y ranges in value from zero to one, inclusive, with a value of zero corresponding to when a minor line first appears and one corresponding to when the minor grid line becomes a major grid line. An algorithm that may be used to determine when a minor grid line becomes a major grid line, and vice versa, is described in conjunction with FIGS. 4B and 4C.

Different values may be used for opacity parameters beta, m, c, and n, and the opacity parameter values may be controlled by an end user through a graphical user interface (GUI) associated with the application program 112 of FIG. 1. Persons skilled in the art will recognize that a drag-and-drop scheme for defining associations may provide an intuitive and efficient entry means for users.

Figure 4A:
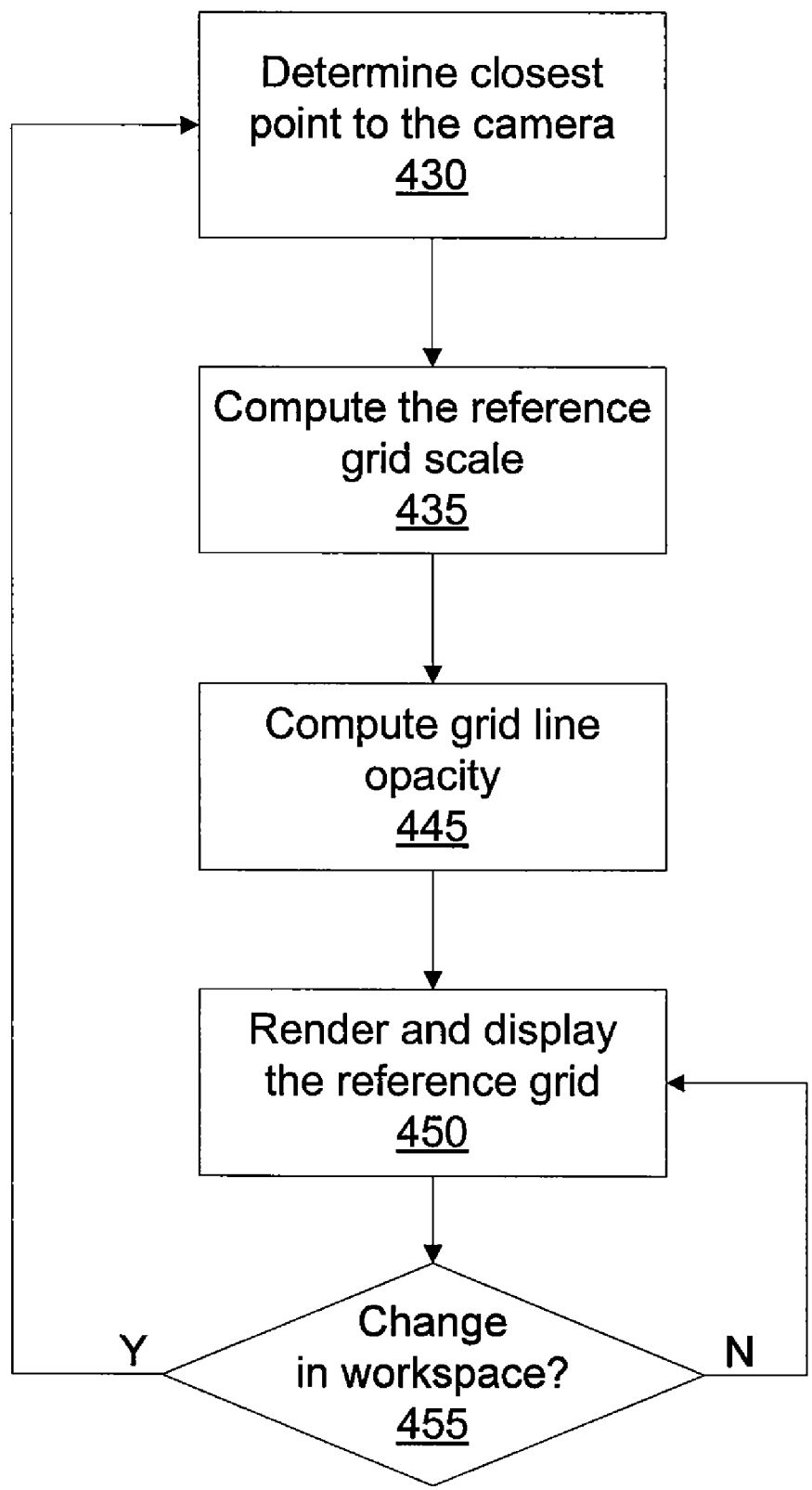
FIG. 4A is a flow diagram of method steps for displaying the multiscale 3D reference grid within a scene, according to one embodiment of the invention.

FIG. 4A is a flow diagram of method steps for displaying the multiscale 3D reference grid within a scene, according to one embodiment of the invention. Although the method steps are described in conjunction with the system of FIG. 1, persons skilled in the art will understand that any system configured to perform the method steps, in any order, is within the scope of the invention.

The method begins in step 430, where the closest point on the plane of the reference grid that is viewable by the camera (within the viewport of the camera) is determined. Given an eye (camera) position and view direction vector, the closest point on the plane of the reference grid is determined using a small angular offset towards the reference grid from the projection of the view direction vector onto the reference grid. In step 435, the reference grid scale is computed using the closest point on the plane of the reference grid. The maximum rate of change of the coordinates of the closest point. The details of steps 430 and 435 are described in conjunction with FIGS. 4B and 4C.

As previously explained, the reference grid scale controls the spacing and subdivisions of the grid lines within the reference grid. The grid scale controls the transitions of major grid lines to minor grid lines, and vice versa. In step 445, the opacity of the grid lines is computed. Equation 1 may be used to compute the opacity of the grid lines. In step 450, the scene, including the reference grid, is rendered and displayed. An explicit horizon and semi-transparent sky may also be rendered and displayed to provide an end user with additional depth cues and clarification regarding the special relationships and orientation.

In step 455, the application program 112 determines if the workspace has changed in manner that necessitates recomputation of the reference grid. For example, the camera position may have changed or an object in the scene may have changed and/or been moved, added, or deleted. If, in step 455 the application program 112 determines that the workspace has not changed in a manner that necessitates recomputation of the reference grid, then step 450 is repeated. Otherwise, the application program 112 returns to step 430.

Figure 4B:
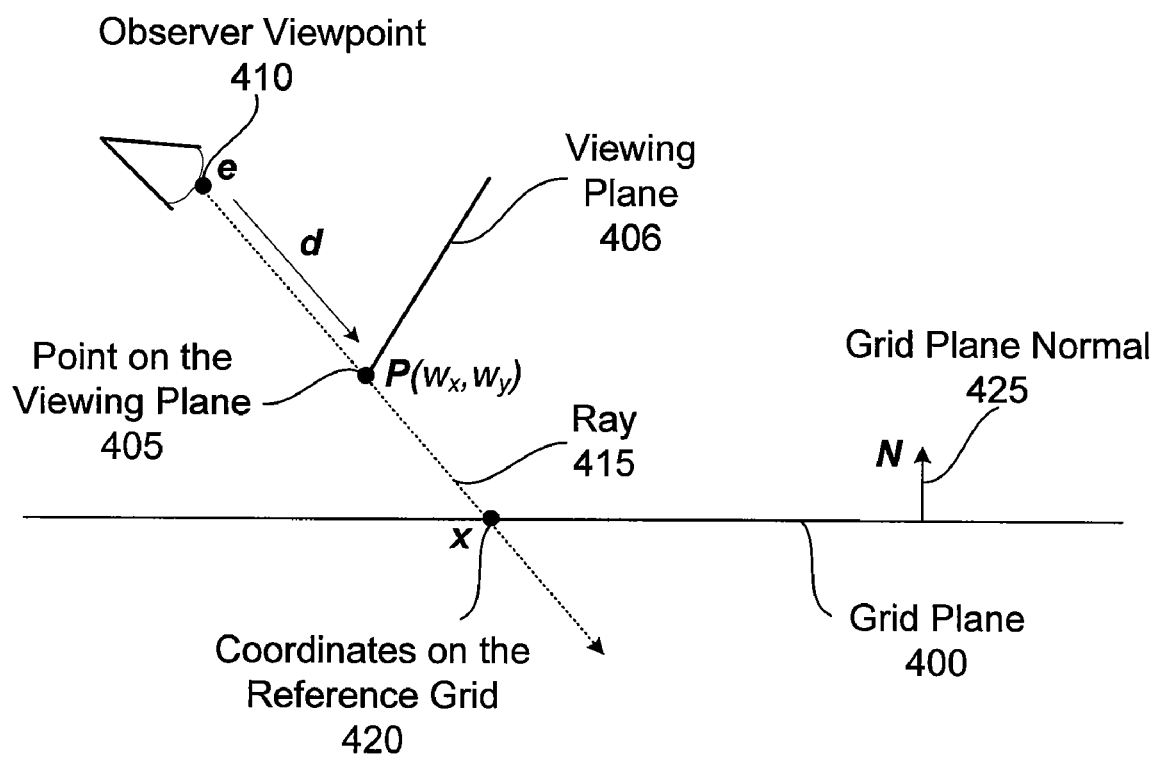
FIG. 4B illustrates multiscale 3D reference grid scaling variables that are used to determine the multiscale 3D reference grid scale, according to one embodiment of the invention.

FIG. 4B illustrates multiscale 3D reference grid scaling variables that are used to determine the multiscale 3D reference grid scale, according to one embodiment of the invention. The reference grid scale is computed using a screen-space based approach using the maximum of the screen-space derivatives of the reference grid plane coordinates. This approach is path-invariant with respect to the camera since it depends exclusively on the current camera configuration and, advantageously avoids many of the corner cases and singularities of other methods for determining the reference grid scale. Importantly, a given camera configuration yields the same grid spacing, regardless of the path taken to reach that configuration in order to provide the end user with an intuitive and consistent experience. In contrast, other methods for determining the grid scale may change the scale when the camera is translated to reach a position, but not when the camera is rotated to reach the same position.

In order to compute the reference grid scale, the distance from the camera to the reference grid is determined. While it may be clear how far the camera is from the reference grid when the camera is above or below the reference grid and the camera direction is towards the reference grid, it is more difficult to determine the distance from the camera to the reference grid when the camera direction is fully parallel or nearly parallel to the plane of the reference grid. When the camera direction is fully parallel or nearly parallel to the plane of the reference grid and the true distance is used there will be too many grid lines at some points and not enough grid lines at other points on the reference grid. Many methods of determining the reference grid scale are inadequate and produce undesirable results when the camera orbits or when the camera direction is fully parallel or nearly parallel to the plane of the reference grid. Using the screen-based approach overcomes many of the shortcomings of other methods that were considered for determining the reference grid scale.

Referring to FIG. 4B, a scalar quantity, a is computed that characterizes the rate of change of coordinates of the reference grid relative to an infinitesimal change in window coordinates at a given screen-space location $w_x, w_y$ that corresponds with a point on the viewing plane 405, point p. Alpha is computed at the closest point on the grid plane 400 that is viewable by the camera, point x corresponding to coordinates on the reference grid 420. Point x is where the coordinates of the grid plane 400 are changing the fastest. Alpha is linear in the sense that as alpha becomes twice as large, twice as many grid lines are needed in each direction to retain constant spacing of the grid lines in screen space. Alpha is used to select a reference grid scale from a pre-defined range of grid scales that may correspond to units of length, e.g., millimeters, centimeters, or the like. The grid scales may be stored in a table that is read using alpha.

The calculated value of alpha can be multiplied by a scalar to produce a modified alpha value and fine-tune the number of grid lines that are visible in a scene. The modified alpha value is then used to determine if a change in the grid scale is needed. For example, if the modified alpha value is greater than half of the absolute difference between the current grid scale and the closest larger grid scale, in world units, then the grid scale is changed to the larger (coarser) grid scale. If the modified alpha value is less than half of the absolute difference between the current grid scale and the closest smaller grid scale, in world units, then the grid scale is changed to the smaller (finer) grid scale. Otherwise, the grid scale does not change. For a more specific example, assume that 1 world unit is equivalent to 1 meter, and the current grid scale is represented in meters. The closest larger grid scale is 1 decameter (10 meters) and half of the absolute difference between the current grid scale and the closest larger grid scale is $|(10-1)/2|=4.5$. The closest smaller grid scale is 1 decimeter (0.1 meters) and half of the absolute difference is $|(1-0.1)/2|=0.45$. The grid scale changes to decameters when the modified alpha value is greater than 4.5 and the grid scale changes to decimeters when the modified alpha value is less than 0.45. Otherwise, the grid scale is unchanged.

The alpha values for a scene are constructed using normalized window coordinates where grid plane 400 is defined by N dot x=h, where N is grid plane normal 425, x is coordinates on the grid plane 420, and h is the normal offset between the origin and grid plane 400. A point on the viewing plane 406 through which grid plane 400 lies is found, such as point p that corresponds to window coordinates $(w_x, w_y)$. A ray 415 is intersected from the observer viewpoint 410 through point p to determine the local coordinates on the grid plane 420 corresponding to x. Specifically, assuming e (observer viewpoint 410) is the location of the observer and d=p−e is the direction of ray 415, then the following equation may be used to compute the coordinates of x, coordinates on the grid plane 420:

$$x = e + ((h - (N \text{ dot } e))/(N \text{ dot } d))^* d. \qquad \text{Equation 2}$$

Points along ray 415, expressed as e+td, may be computed by applying the inverse modelview-projection transformation to homogeneous clip coordinates associated with the window coordinates $w_x$ and $w_y$. Let $A = M^{-1}P^{-1}$, where M is the current homogeneous modelview transformation and P is the current perspective projection transformation. The following equations may be used to determine the origin and direction of ray 415 prior to a homogeneous divide, e' and p'.

$$e' = A[w_x, w_y, -1, 1]^T, \qquad \text{Equation 3}$$

$$p' = A[w_x, w_y, 1, 1]^T. \qquad \text{Equation 4}$$

Following a homogeneous divide, the direction of ray 415, d, may be determined as the difference between p and e. Then, the coordinates of the closest point on grid plane 400 that is viewable by the camera, x (coordinates on the grid plane 420) are computed by evaluating equation 2.

The maximum of the rate of change of the reference grid coordinates relative to the infinitesimal change in the window coordinates at screen space location, $w_x, w_y$ may be computed to determine the value of alpha.

$$\text{alpha} = \max(\|\delta x/\delta w_x\|_2, \|\delta y/\delta w_y\|_2) \qquad \text{Equation 5}$$

Equation 2 is evaluated to determine x and then equation 5 is used to define alpha explicitly in terms of window coordinates and the current transformation matrices. Although it is possible to approximate the derivatives of equation 5, approximations were found to be too noisy at glancing angles. Equation 5 approximates the maximum rate of change of the coordinates on the grid plane 420 without using approximations of the derivatives.

Figure 4C:
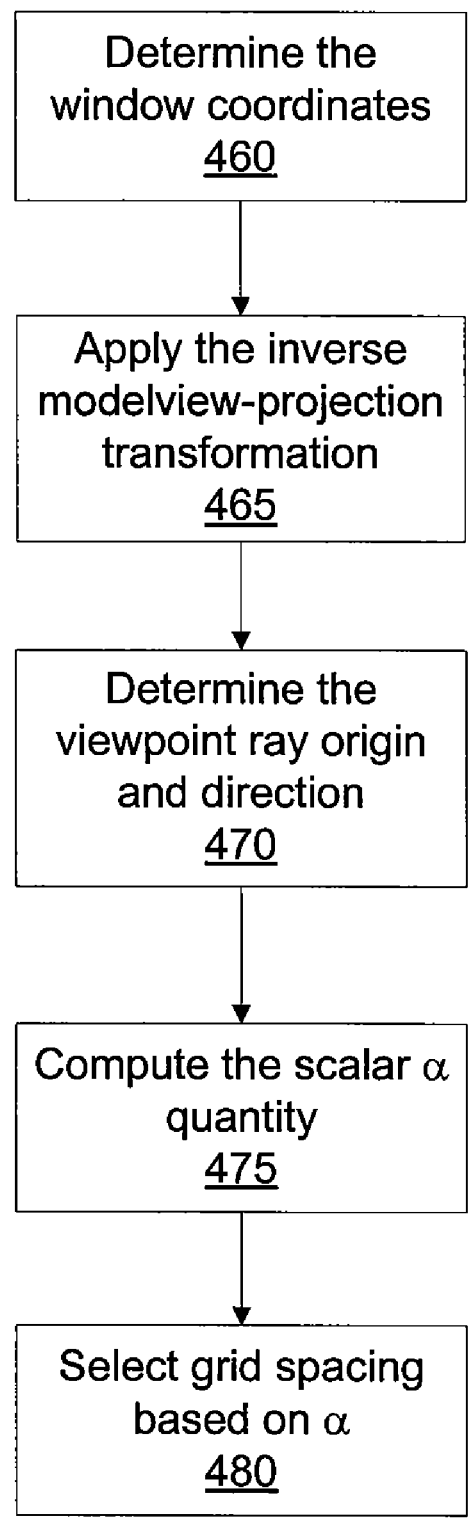
FIG. 4C is a flow diagram of method steps for determining the multiscale 3D reference grid scale, according to one embodiment of the invention.

FIG. 4C is a flow diagram of method steps for determining the multiscale 3D reference grid scale, according to one embodiment of the invention. Although the method steps are described in conjunction with the system of FIG. 1, persons skilled in the art will understand that any system configured to perform the method steps, in any order, is within the scope of the invention. The method steps shown in FIG. 4C may be used to complete steps 430 and 435 of FIG. 4A.

The method begins in step 460, where the window coordinates of the screen-space location $w_x, w_y$ that corresponds with the point on the viewing plane 405 (point p of FIG. 4B)

is identified. In step 465, the inverse modelview-projection transformation is used to compute p and e using equations 3 and 4. In step 470, the viewpoint ray 415 origin and direction are determined as the difference between p and e. In step 475, alpha is computed using equation 5. In step 480, alpha is used to select the reference grid scale that determines the grid spacing.

In sum, a technique is disclosed for providing users of design software application programs with continuous reference imagery for camera-operation visualization and scene content understanding. The multiscale three-dimensional reference grid appears infinite in space and scale and depth cues are provided in both the perspective and parallel viewing projections to allow users to sense the orientation of the workspace. Spacing of the grid lines are determined dynamically and are independent of the viewing projection, enabling smooth transitions as grid lines are added and removed. The features of the reference grid reduce the need for an end user to construct a mental model of the scene to clarify the spatial relationships between objects in the scene by viewing the scene from different viewpoints and garnering depth cues by changing the camera position. The end user workflow is simplified and more intuitive, thereby improving the end user experience.

Providing Position Pegs in the Workspace

Position pages are an ambient feedback mechanism designed to complement the planar nature of the reference grid. When an object in the 3D workspace does not intersect the reference grid, it becomes difficult to understand spatial relationships between the object and other objects in the workspace. In particular, powerful depth cues, such as relative size and height in the visual field are rendered ineffective. Conventionally, users understand the relative size and positions of multiple objects in the workspace by changing the camera's point of view to develop a mental model of the workspace. Position pegs augment the reference grid by indicating the projected position of the object on the reference grid, as well as the object's distance above or below the reference grid. By providing the end user with these two cues, the height and depth of the object becomes unambiguous and judgments concerning the relative size and position of objects in the workspace are more easily made and more accurate.

Figure 5A:
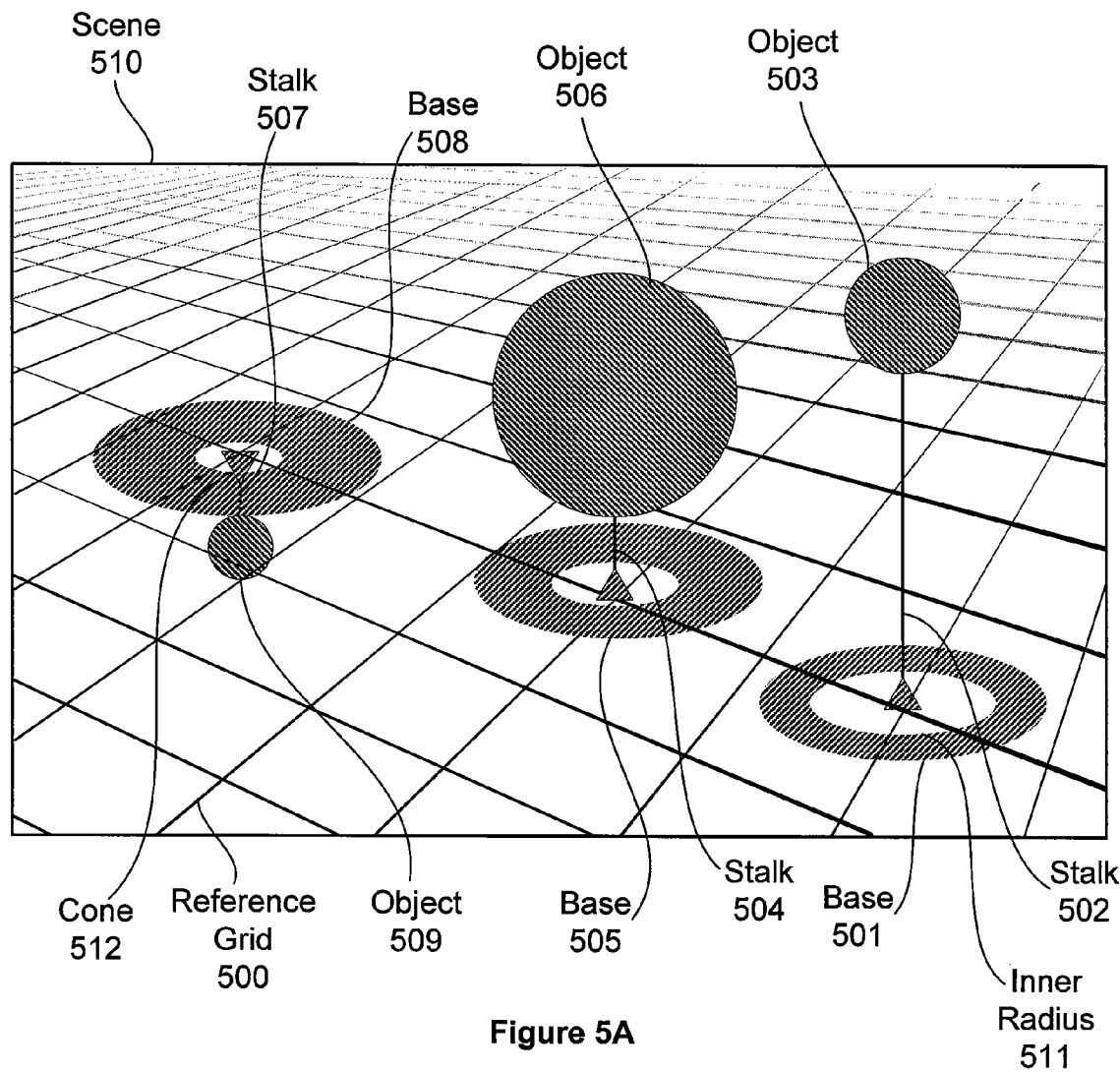
FIG. 5A illustrates position pegs and a multiscale 3D reference grid in a workspace, according to one embodiment of the invention.

FIG. 5A illustrates position pegs and a reference grid 500 in a workspace, according to one embodiment of the invention. Reference grid 500 may be a multiscale 3D reference grid or another type of reference grid, including a conventional reference grid. A position peg includes two main parts: a base and a stalk. The base appears as a disk, co-planar with reference grid 500 and primarily provides positional information about a given object in scene 510. As shown in FIG. 5A, a base 505 and a stalk 504 correspond with a geometric object 506, a base 501 and 1 stalk 502 correspond with a geometric object 503, and a base 508 and a stalk 507 correspond with geometric object 509. With respect to geometric object 506, the base 505 shows where the center of mass of geometric object 506 orthogonally projects onto the reference grid 500. Similarly, base 501 shows where the center of mass of geometric object 503 orthogonally projects onto the reference grid 500. The shaded inner region of the base 501 defined by an inner radius 511 provides coarse grain information of the relative height of the geometric object 501 compared to other geometric objects in the scene 510. Bases with smaller inner radii (thicker disks) are closer to the reference grid 500 compared with bases with larger inner radii (thinner disks). For example, the object 506 is closer to the reference grid 500 than the object 503. The object 509 is the closest to the reference grid 500 and object 509 lies below the reference grid 500.

A cone is rendered in the center of center of each base, e.g., a cone 512 in the center of the base 508. The cone indicates the direction in which the geometric object lies, i.e., above or below the reference grid 500. The cones in the centers of bases 501 and 505 indicate that geometric objects 503 and 506 are positioned above the reference grid 500. The cone 512 indicates that the geometric object 509 lies below the reference grid 500. In some embodiments of the present invention, the position pegs that lie below the reference grid 500 are drawn more transparently than the position pegs that lie above the reference grid 500. The stalk 507 is represented with a dashed line since stalk 507 is positioned below the reference grid 500.

The stalks 507, 502, and 504 provide finer grained height information about the corresponding geometric objects 509, 503, and 506, respectively, compared with the bases 508, 501, and 505. The length of each stalk instantly communicates distance from the reference grid 500 to the corresponding geometric object. Note that height information includes distances between geometric objects and the reference grid 500 for geometric objects that are positioned above the reference grid 500 and below the reference grid 500. In addition, each stalk couples a geometric object to the corresponding base. As the salience of a stalk degrades when a geometric object is near to the reference grid 500, the base provides the missing relative height information to the end user. Conversely, as the salience of the base degrades when the geometric object is far from the reference grid 500, the stalk provides the missing relative height information to the end user. The position pegs indicate which geometric objects are above the reference grid 500, which geometric objects are below the reference grid 500, and where the geometric objects intersect the reference grid 500, without fully occluding the reference grid 500. Finally, position pegs are designed as abstract representations of geometry (instead of shadows) so the position pegs can be used in conjunction with in-scene shadows without confusing an end user.

Figure 5B:
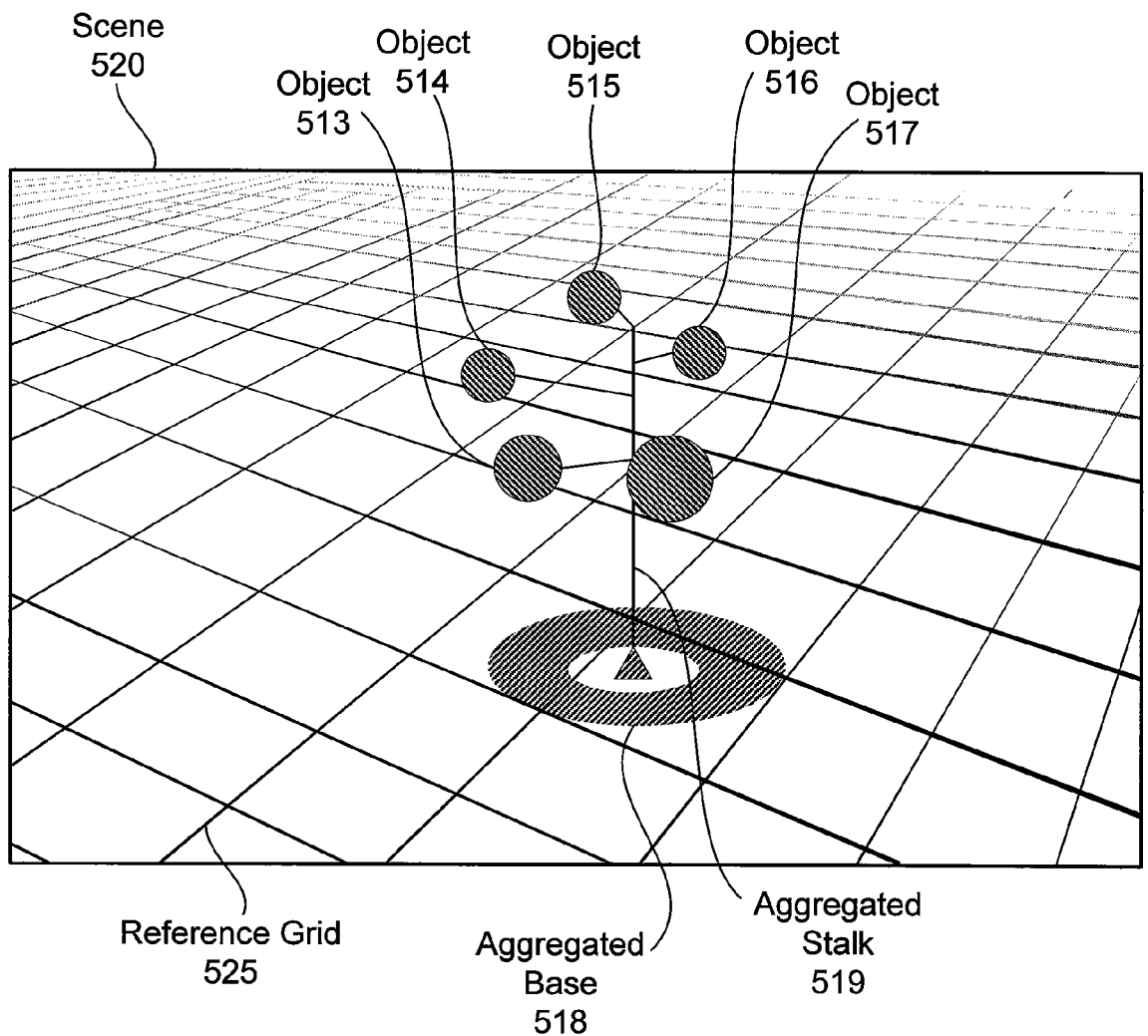
FIG. 5B illustrates an aggregated position peg in a 3D workspace, according to one embodiment of the invention.

FIG. 5B illustrates an aggregated position peg in a 3D workspace, according to one embodiment of the invention. Reference grid 525 may be a multiscale 3D reference grid or another type of reference grid, including a conventional reference grid. Position pegs also operate seamlessly in a multiscale environment through the ability to aggregate with one another when objects in the workspace begin to cluster too closely to one another, for example when an end user zooms out. The position pegs for objects 513, 514, 515, 516, and 517 aggregate when their bases begin to overlap excessively in scene 520. The aggregated position peg includes an aggregated base 518 and an aggregated stalk 519. The aggregated base 518 represents the center of mass of the combined geometric objects 513, 514, 515, 516, and 517. The aggregated stalk 519 extends from the aggregated base 518 to the maximum distance of the distances between each one of the geometric objects 513, 514, 515, 516, and 517 and the reference grid, with branches coming off to separately couple the center of mass of each one of the geometric objects 513, 514, 515, 516, and 517 to the trunk of the aggregated stalk 519. The intersection of the branches with the trunk allows the end user to infer the relative height of the individual geometric objects 513, 514, 515, 516, and 517. In some embodiments of the present invention, geometric objects that lie above the reference grid 525 are aggregated separately from geometric objects that lie below the reference grid 525, i.e., there will be two aggregated stalks extending in opposite directions from an aggregated base. Additionally, a property other than distance may be used to determine whether or not position pegs for geometric objects are aggregated. For example, position pegs for geometric objects may be aggregated when the geometric objects share an object type (e.g. all cubes) or object color (e.g. all red objects), and the like.

Since the position pegs are projected onto the reference grid 525, identification of the overlapping bases is reduced to a two-dimensional clustering problem. The size of the disk used to represent the position peg bases may be modified by the end user, by increasing or decreasing the outer radius of the base to control when position pegs aggregate. Aggregated position pegs, such as the aggregated position peg including aggregated base 518 and aggregated stalk 519 may be displayed in a different color compared with non-aggregated position pegs. The base size, position peg color, and aggregated position peg color may be controlled by an end user through a graphical user interface (GUI) associated with the application program 112 of FIG. 1. Persons skilled in the art will recognize that a drag-and-drop scheme for defining associations may provide an intuitive and efficient entry means for users.

Figure 5C:
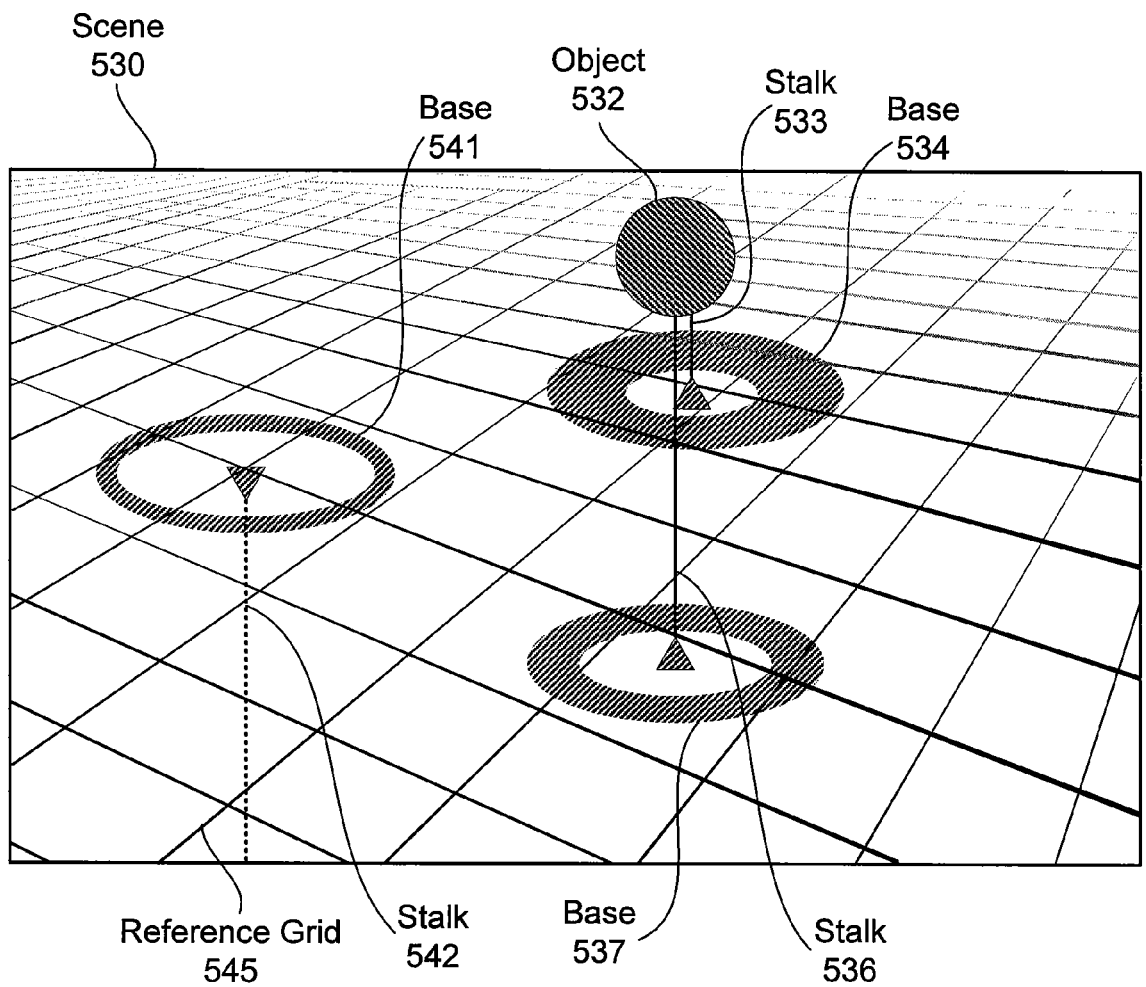
FIG. 5C illustrates an occluded object and an object lying outside the viewport and position pegs in a 3D workspace, according to one embodiment of the invention.

FIG. 5C illustrates an occluded geometric object and position pegs in a 3D workspace, according to one embodiment of the invention. Reference grid 545 may be a multiscale 3D reference grid or another type of reference grid, including a conventional reference grid. Position pegs present users with height information about geometric objects that are nearby, but outside of the viewport, and geometric objects that are occluded by other geometric objects. As shown in scene 530, a geometric object that lies outside of the viewport is coupled to reference grid by a position peg including a base 541 and a stalk 542. Another geometric object is occluded by a geometric object 532. The end user is aware of the position of the occluded geometric object since the position peg including a stalk 533 and a base 534 that corresponds to the occluded geometric object is visible. The occluding geometric object 532 has a corresponding position peg that includes a stalk 536 and a base 537. The end user can infer that the occluded geometric object is closer to the reference grid 545 than the geometric object 532 since the base 534 is thicker than the base 534.

Figure 5D:
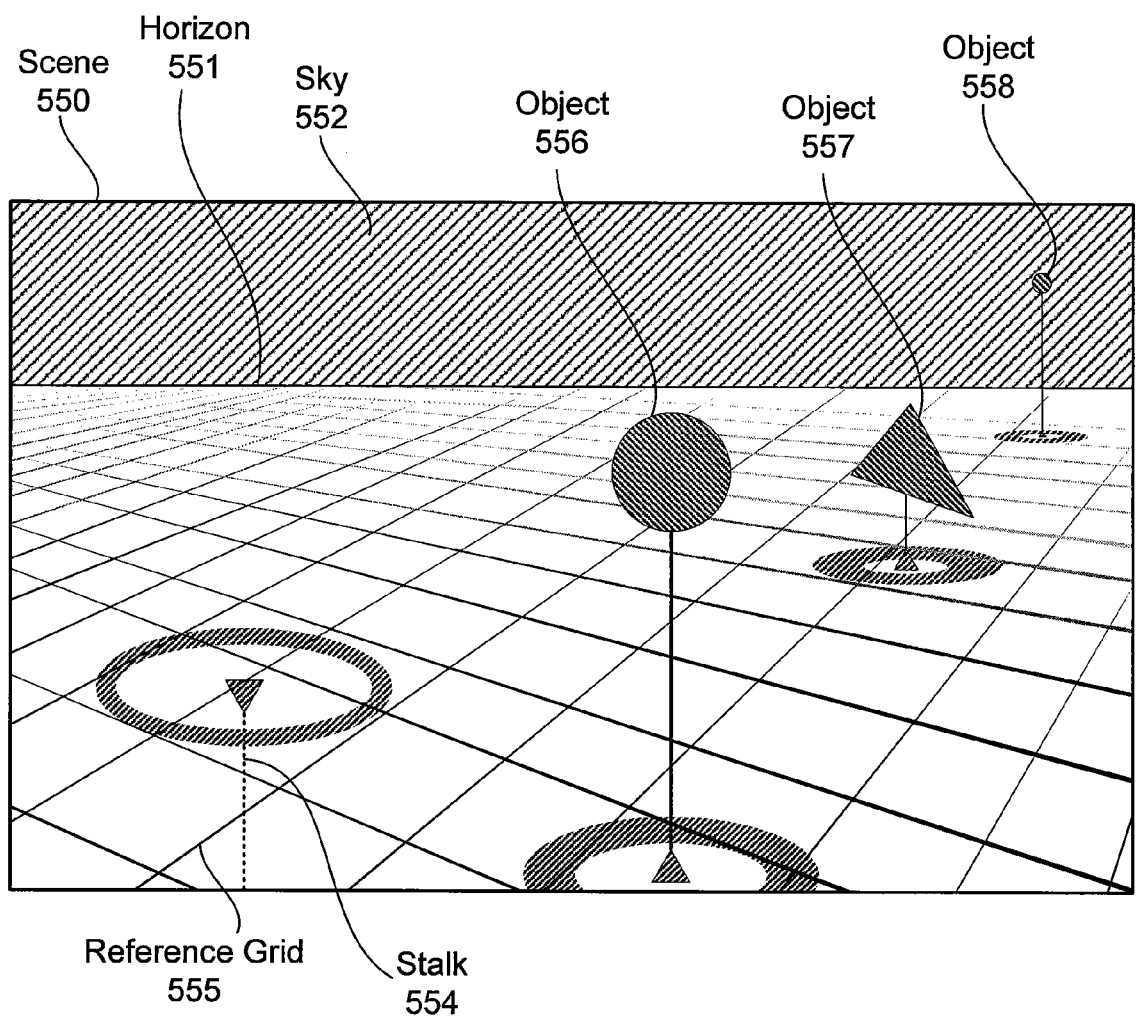
FIG. 5D illustrates position pegs and a distant object in a 3D workspace, according to one embodiment of the invention.

FIG. 5D illustrates position pegs and a distant geometric object 558 in a 3D workspace, according to one embodiment of the invention. Reference grid 555 may be a multiscale 3D reference grid or another type of reference grid, including a conventional reference grid. Position pegs present users with height information about geometric objects in the distance. As shown in scene 550, a geometric object that lies outside of the viewport is coupled to reference grid 555 by a position peg including a stalk 554. A geometric object 558 in the distance is also coupled to the reference grid 555. The sky 552 and a horizon 551 are also visible in the scene 550 and provide context as well as depth cues. The position pegs allow an end user to accurately infer the relative positions and heights of geometric object 558 compared with geometric objects 556 and 557.

Figure 5E:
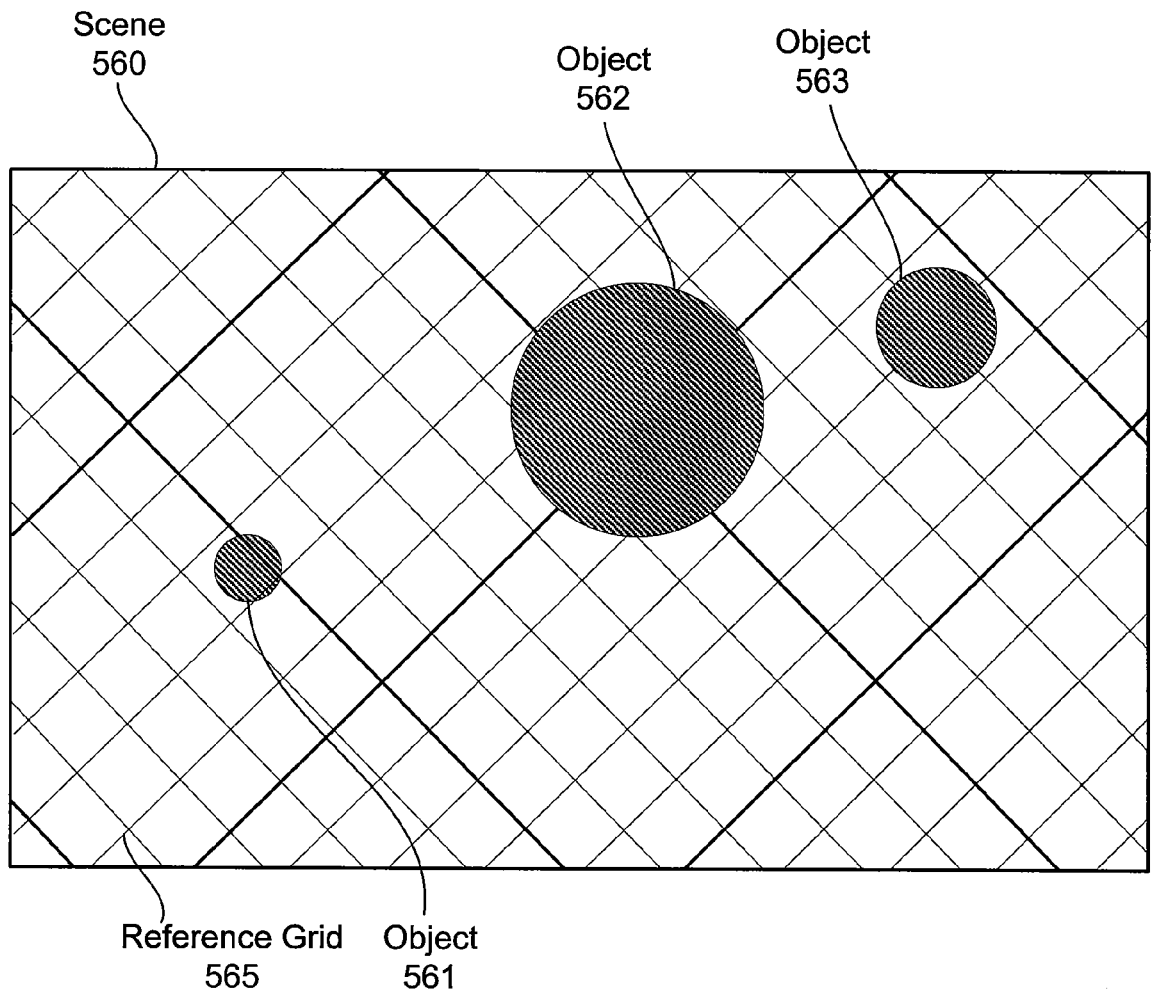
FIG. 5E illustrates a multiscale 3D reference grid and objects using a parallel projection without position pegs, according to one embodiment of the invention.

FIG. 5E illustrates a multiscale 3D reference grid 565 and geometric objects 561, 562, and 563 using a parallel projection without position pegs, according to one embodiment of the invention. Reference grid 565 may be a multiscale 3D reference grid or another type of reference grid, including a conventional reference grid. As previously explained, when the 3D workspace is viewed using a parallel projection, fewer depth cues are visible to the end user compared with perspective projection. Without the presence of position pegs in scene 560 it is difficult to determine the relative positions and sizes of geometric objects 561, 562, and 563.

Figure 5F:
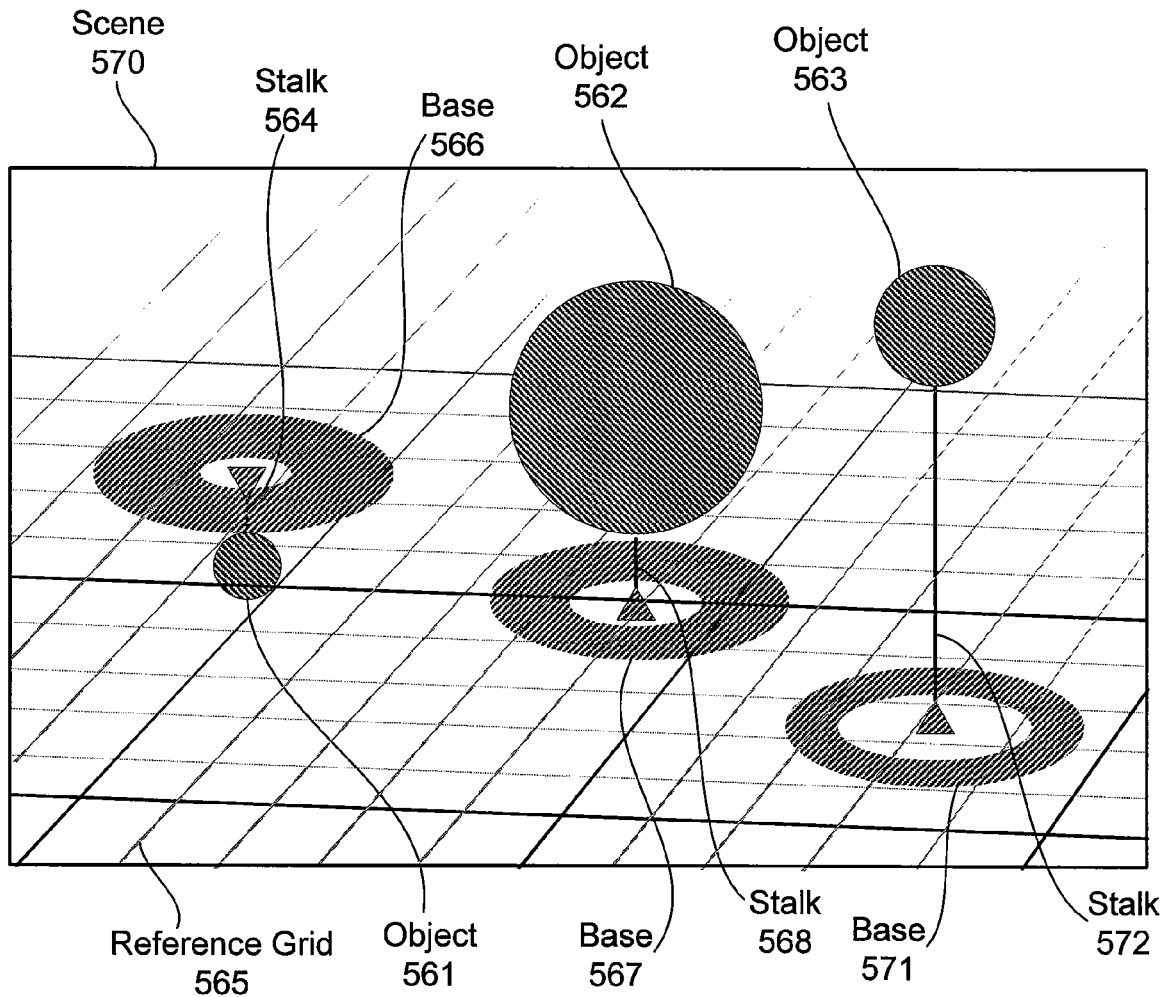
FIG. 5F illustrates the multiscale 3D reference grid, objects, and position pegs using a parallel projection, according to one embodiment of the invention.

FIG. 5F illustrates the multiscale 3D reference grid 565, geometric objects 561, 562, and 563, and position pegs using a parallel projection, according to one embodiment of the invention. A position peg including a base 566 and a stalk 564 couples geometric object 561 to the reference grid 565, a position peg including a base 567 and a stalk 568 couples geometric object 562 to the reference grid 565, and a base 571 and a stalk 572 couples an object 563 to the reference grid 565. These position pegs provide the end user with reference imagery for scene content understanding, e.g., relative position and size information.

Figure 5G:
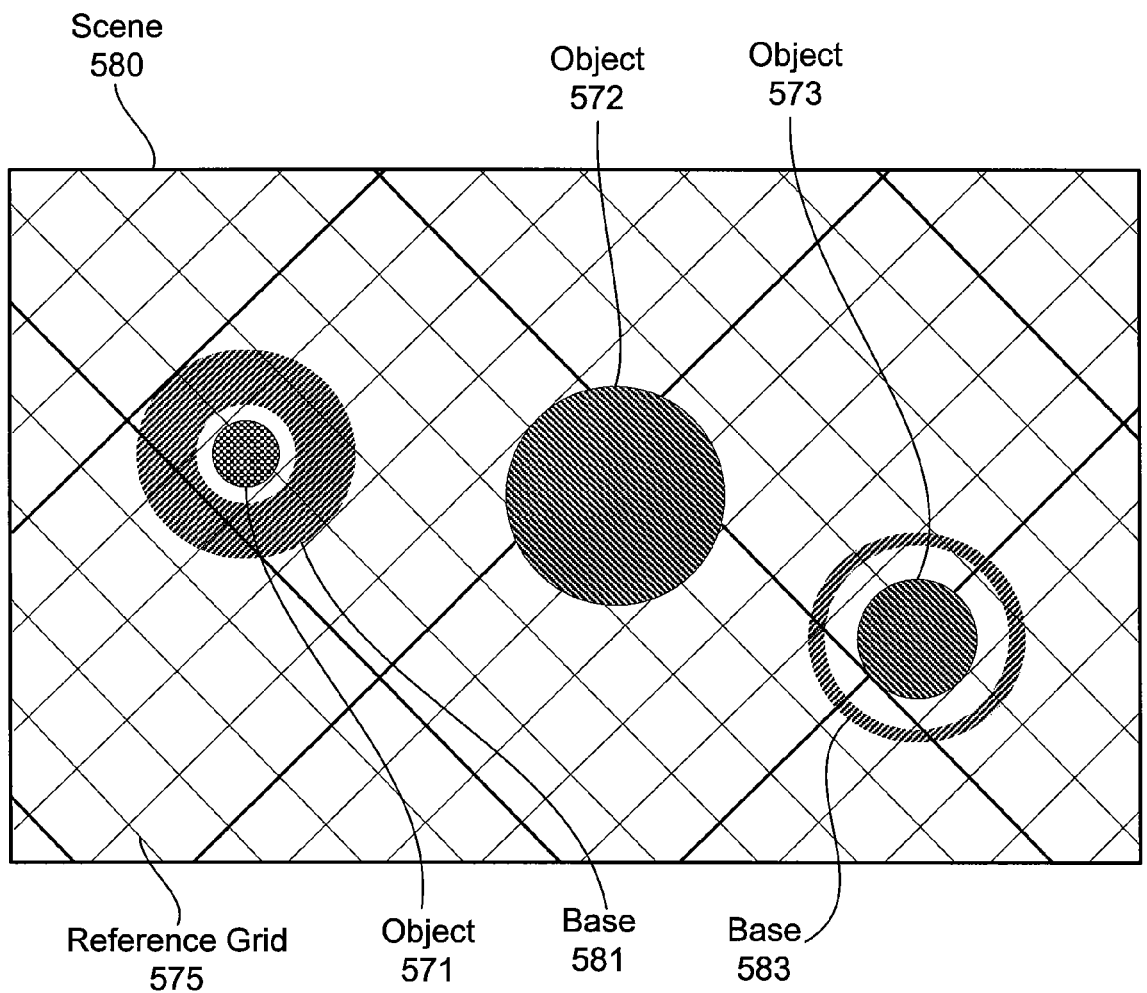
FIG. 5G illustrates the multiscale 3D reference grid, objects, and position pegs using a parallel projection viewed from above, according to one embodiment of the invention.

FIG. 5G illustrates the multiscale 3D reference grid 575, geometric objects 571, 572, and 573, and position pegs using a parallel projection viewed from above, according to one embodiment of the invention. Reference grid 575 may be a multiscale 3D reference grid or another type of reference grid, including a conventional reference grid. Position pegs provide information about the relative height of geometric objects 571, 572, and 573 in scene 580, even when the stalks are partially or fully occluded. Again, this is especially helpful when the 3D workspace is viewed using a parallel projection. The bases 581 and 583 provide the end user with height information for objects 571 and 573, respectively. The base outer radius size may be increased by the end user so that geometric object 572 does not occlude the base that corresponds to geometric object 572.

Figure 6:
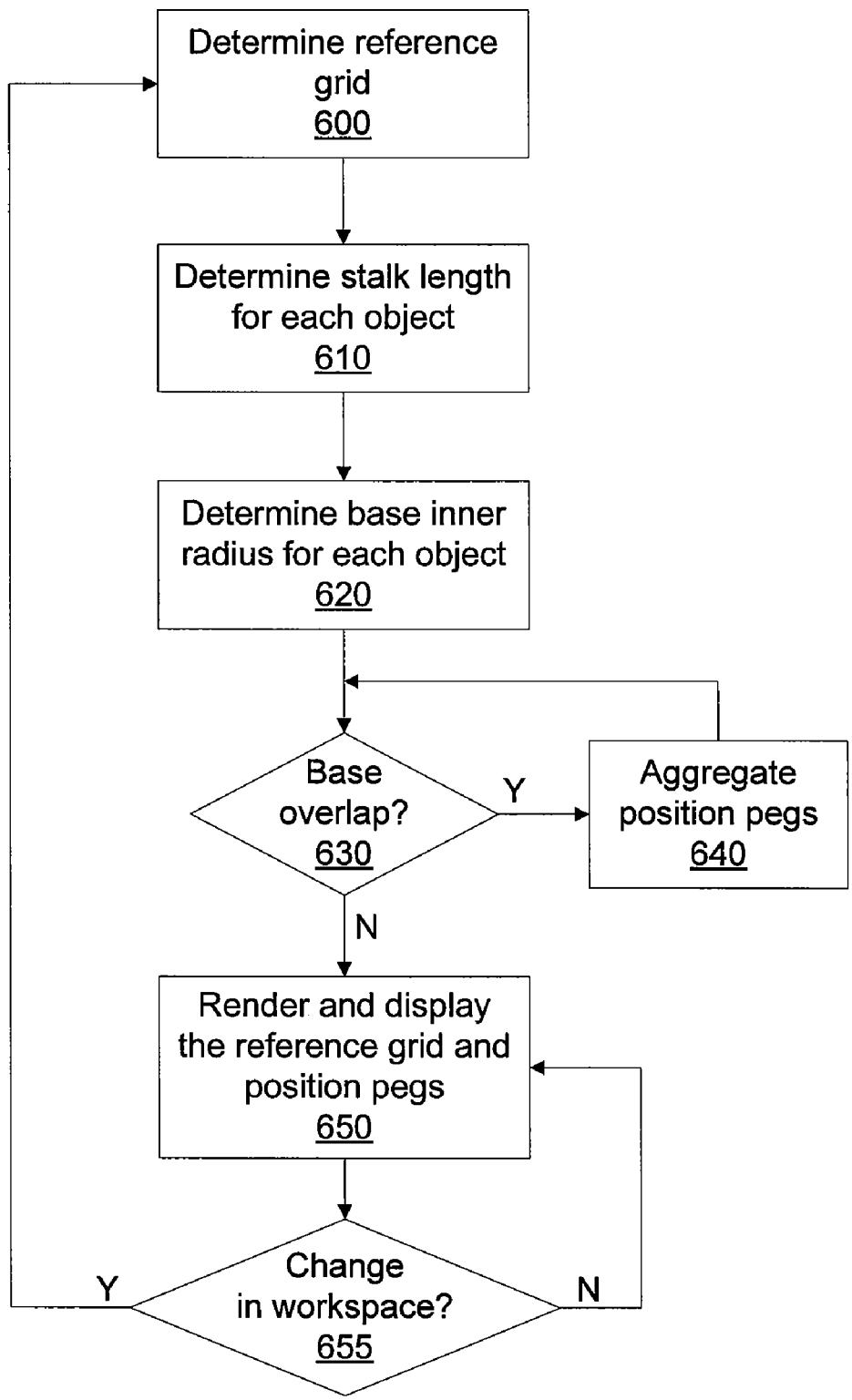
FIG. 6 is a flow diagram of method steps for displaying the multiscale 3D reference grid and position pegs within a scene, according to one embodiment of the invention.

FIG. 6 is a flow diagram of method steps for displaying the multiscale 3D reference grid and position pegs within a scene, according to one embodiment of the invention. Although the method steps are described in conjunction with the system of FIG. 1, persons skilled in the art will understand that any system configured to perform the method steps, in any order, is within the scope of the invention.

The method begins in step 600, where the reference grid is determined. Steps 430, 435, and 445 of FIG. 4A may be performed to determine a multiscale 3D reference grid in step 600. In step 610, the application program 112 determines a stalk length of a position peg for each geometric object in the scene. In step 620, the application program 112 determines an inner radius for each base of a position peg for each geometric object in the scene. In step 630, the application program 112 determines if any of the bases overlap. Note that a threshold value may be used to determine whether or not the bases overlap by an amount that triggers aggregation of the corresponding position pegs. Such a threshold value may be specified by an end user or may depend on the camera position relative to the geometric objects and/or reference grid.

If, in step 630, the application program 112 determines that one or more bases overlap, then in step 640 the position pegs that include the overlapping bases are aggregated and step 630 is repeated. Otherwise, in step 650 the scene, including the reference grid and position pegs, is rendered and displayed. An explicit horizon and semi-transparent sky may also be rendered and displayed to provide an end user with additional depth cues and clarification regarding the spacial relationships and orientation.

In step 655, the application program 112 determines if the workspace has changed in manner that necessitates recomputation of the reference grid or position pegs. For example, the camera position may have changed or an object in the scene may have changed and/or been moved, added, or removed. If, in step 455 the application program 112 determines that the workspace has not changed in a manner that necessitates recomputation of the reference grid or position pegs, then step 650 is repeated. Otherwise, the application program 112 returns to step 600.

In sum, a technique is disclosed for providing users of design software application programs with continuous reference imagery for camera-operation visualization and scene content understanding. The position pegs may be provided in both the perspective and parallel viewing projections to allow users to sense the orientation of geometric objects relative to each other and relative to a reference grid of the workspace. The position pegs are an abstract representation of shadows, allowing coarse grain height estimates to be inferred for any object in the 3D workspace, independent of the viewing projection. The end user workflow is simplified and more intuitive, thereby improving the end user experience.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for generating a multiscale three-dimensional reference grid positioned in a graphics workspace, the method comprising:
    determining a closest point disposed on a plane of the three-dimensional reference grid and viewable by a camera;
    computing a scale for the three-dimensional reference grid based on a maximum rate of change of the coordinates of the closest point;
    rendering the graphics workspace and the three-dimensional reference grid as viewed from the camera to produce a display image, wherein the spacing of grid lines in the three-dimensional reference grid is based on the computed scale; and
    storing the display image in a memory or displaying the display image on a display device.

2. The method of claim 1, further comprising the step of drawing a horizon between the three-dimensional reference grid and a sky.

3. The method of claim 1, wherein the graphics workspace includes one or more geometric objects.

4. The method of claim 1, wherein the plane of the three-dimensional reference grid is semi-transparent.

5. The method of claim 1, wherein a first portion of the grid lines comprises major grid lines, and a second portion of the grid lines comprises minor grid lines that are less visible to an end user compared with the major grid lines.

6. The method of claim 1, further comprising the step of computing an opacity of a grid line in the three-dimensional reference grid, wherein the opacity increases as the grid line transitions from a minor grid line to a major grid line and decreases as the grid line transitions from the major grid line to the minor grid line.

7. The method of claim 1, wherein portions of the grid lines of the three-dimensional reference grid located farther away from the camera are less visible to an end user.

8. The method of claim 1, wherein the step of computing the scale is performed independently of a viewing projection of the scene and is dependent only on the current position of the camera.

9. The method of claim 1, further comprising the steps of:
    determining that the closest point on the plane of the three-dimensional reference grid has changed;
    determining a second closest point disposed on the plane of the three-dimensional reference grid;
    computing a second scale of the three-dimensional reference grid based on a maximum rate of change of the coordinates of the second point;
    rendering the graphics workspace and the three-dimensional reference grid as viewed from the camera to produce a second display image, wherein the spacing of the grid lines in the three-dimensional reference grid is based on the computed second scale; and
    storing the second display image in the memory or displaying the second display image on the display device.

10. A non-transitory computer-readable medium including instructions that, when executed by a processing unit, cause the processing unit to generate a multiscale three-dimensional reference grid positioned in a workspace, by performing the steps of:
    determining a closest point disposed on a plane of the three-dimensional reference grid and viewable by a camera;
    computing a scale for the three-dimensional reference grid based on a maximum rate of change of the coordinates of the closest point;
    rendering the graphics workspace and the three-dimensional reference grid as viewed from the camera to produce a display image, wherein the spacing of grid lines in the three-dimensional reference grid is based on the computed scale; and
    storing the display image in a memory or displaying the display image on a display device.

11. The non-transitory computer-readable medium of claim 10, further comprising the step of drawing a horizon between the three-dimensional reference grid and a sky.

12. The non-transitory computer-readable medium of claim 10, wherein the graphics workspace includes one or more geometric objects.

13. The non-transitory computer-readable medium of claim 10, wherein the plane of the three-dimensional reference grid is semi-transparent.

14. The non-transitory computer-readable medium of claim 10, wherein a first portion of the grid lines comprises major grid lines, and a second portion of the grid lines comprises minor grid lines that are less visible to an end user compared with the major grid lines.

15. The non-transitory computer-readable medium of claim 10, further comprising the step of computing an opacity of a grid line in the three-dimensional reference grid, wherein the opacity increases as the grid line transitions from a minor grid line to a major grid line and decreases as the grid line transitions from the major grid line to the minor grid line.

16. The non-transitory computer-readable medium of claim 10, wherein portions of the grid lines of the three-dimensional reference grid located farther away from the camera are less visible to an end user.

17. The non-transitory computer-readable medium of claim 10, wherein the step of computing the scale is performed independently of a viewing projection of the scene and is dependent only on the current position of the camera.

18. The non-transitory computer-readable medium of claim 10, further comprising the steps of:
   determining that the closest point on the plane of the three-dimensional reference grid has changed;
   determining a second closest point disposed on the plane of the three-dimensional reference grid;
   computing a second scale of the three-dimensional reference grid based on a maximum rate of change of the coordinates of the second point;
   rendering the graphics workspace and the three-dimensional reference grid as viewed from the camera to produce a second display image, wherein the spacing of the grid lines in the three-dimensional reference grid is based on the computed second scale; and
   storing the second display image in the memory or displaying the second display image on the display device.

* * * * *